US008886671B1

(12) United States Patent
Ro et al.

(10) Patent No.: US 8,886,671 B1
(45) Date of Patent: Nov. 11, 2014

(54) MULTI-TENANT IN-MEMORY DATABASE (MUTED) SYSTEM AND METHOD

(71) Applicant: Advent Software, Inc., San Francisco, CA (US)

(72) Inventors: Kwang T. Ro, Pleasanton, CA (US); Claudia Villena, San Francisco, CA (US); James M. Gido, Oakland, CA (US); Brian L. Andersen, San Rafael, CA (US)

(73) Assignee: Advent Software, Inc., San Francisco, CA (US)

( * ) Notice: Subject to any disclaimer, the term of this patent is extended or adjusted under 35 U.S.C. 154(b) by 0 days.

(21) Appl. No.: 13/966,575

(22) Filed: Aug. 14, 2013

(51) Int. Cl.
*G06F 17/30* (2006.01)

(52) U.S. Cl.
USPC .......................................................... 707/781

(58) Field of Classification Search
USPC ...................... 707/792, 688, 812, 693, 700
See application file for complete search history.

(56) References Cited

U.S. PATENT DOCUMENTS

| 4,586,035 A | 4/1986 | Baker et al. |
| 4,805,134 A | 2/1989 | Calo et al. |
| 4,853,842 A | 8/1989 | Thatte et al. |
| 4,972,367 A | 11/1990 | Burke |
| 5,008,786 A | 4/1991 | Thatte |
| 5,010,478 A | 4/1991 | Deran |
| 5,043,885 A | 8/1991 | Robinson |
| 5,136,707 A | 8/1992 | Block et al. |
| 5,202,985 A | 4/1993 | Goyal |
| 5,237,661 A | 8/1993 | Kawamura et al. |
| 5,276,835 A | 1/1994 | Mohan et al. |
| 5,283,884 A | 2/1994 | Menon et al. |
| 5,283,894 A | 2/1994 | Deran |
| 5,301,319 A | 4/1994 | Thurman et al. |
| 5,305,389 A | 4/1994 | Palmer |
| 5,398,336 A | 3/1995 | Tantry et al. |
| 5,404,477 A | 4/1995 | Jippo |
| 5,408,653 A | 4/1995 | Josten et al. |
| 5,412,805 A | 5/1995 | Jordan, II et al. |
| 5,426,747 A | 6/1995 | Weinreb et al. |

(Continued)

FOREIGN PATENT DOCUMENTS

WO   WO2005050491   6/2005

OTHER PUBLICATIONS

International Search Report and Written Opinion of the International Searching Authority for PCT/US2007/013575, dated Nov. 26, 2007 (6 pages).

(Continued)

*Primary Examiner* — Mohammed R Uddin
(74) *Attorney, Agent, or Firm* — Stephen C. Glazier; Akerman LLP

(57) ABSTRACT

In various embodiments, systems and methods for Multi-Tenant In-Memory Database access to an application program accessing an object-oriented database (OODB) are disclosed. Embodiments may include: connecting, by a processor, the application program to a data repository for a database; generating, by the processor, a first Firm for a first tenant; placing, by the processor, an address of a first object of the first Firm into a knowledge base pointer associated with the first tenant; placing, by the processor, an address of a main database object of the database into a pointer in an object of the first Firm; and accessing, by the processor, the first Firm through the knowledge base pointer and the database through the pointer object of the first Firm.

15 Claims, 15 Drawing Sheets

(56) References Cited

U.S. PATENT DOCUMENTS

| | | | |
|---|---|---|---|
| 5,428,761 A | 6/1995 | Herliy et al. | |
| 5,434,992 A | 7/1995 | Mattson | |
| 5,437,027 A | 7/1995 | Bannon et al. | |
| 5,455,942 A | 10/1995 | Mohan et al. | |
| 5,465,352 A | 11/1995 | Nakazawa et al. | |
| 5,485,609 A | 1/1996 | Vitter et al. | |
| 5,493,668 A | 2/1996 | Elko et al. | |
| 5,499,367 A | 3/1996 | Bamford et al. | |
| 5,504,862 A | 4/1996 | Suzuki et al. | |
| 5,506,984 A | 4/1996 | Miller | |
| 5,550,971 A | 8/1996 | Brunner et al. | |
| 5,560,006 A | 9/1996 | Layden et al. | |
| 5,561,795 A | 10/1996 | Sarkar | |
| 5,574,902 A | 11/1996 | Josten et al. | |
| 5,608,904 A | 3/1997 | Chaudhuri et al. | |
| 5,611,076 A | 3/1997 | Durflinger et al. | |
| 5,615,360 A | 3/1997 | Bezek et al. | |
| 5,636,350 A | 6/1997 | Eick et al. | |
| 5,649,139 A | 7/1997 | Weinreb et al. | |
| 5,649,182 A | 7/1997 | Reitz | |
| 5,649,188 A | 7/1997 | Nomura et al. | |
| 5,668,987 A | 9/1997 | Schneider | |
| 5,680,573 A | 10/1997 | Rubin et al. | |
| 5,682,527 A | 10/1997 | Cooper et al. | |
| 5,701,461 A | 12/1997 | Dalal et al. | |
| 5,706,506 A | 1/1998 | Jensen et al. | |
| 5,727,203 A | 3/1998 | Hapner et al. | |
| 5,745,904 A | 4/1998 | King et al. | |
| 5,754,938 A | 5/1998 | Herz et al. | |
| 5,758,149 A | 5/1998 | Bierma et al. | |
| 5,787,471 A | 7/1998 | Inoue et al. | |
| 5,799,303 A | 8/1998 | Tsuchimura | |
| 5,805,809 A | 9/1998 | Singh et al. | |
| 5,812,996 A | 9/1998 | Rubin et al. | |
| 5,822,749 A | 10/1998 | Agarwal | |
| 5,826,253 A | 10/1998 | Bredenberg | |
| 5,832,521 A | 11/1998 | Klots et al. | |
| 5,835,908 A | 11/1998 | Bennett et al. | |
| 5,835,959 A | 11/1998 | McCool et al. | |
| 5,842,218 A | 11/1998 | Robinson | |
| 5,864,849 A | 1/1999 | Bohannon et al. | |
| 5,890,166 A | 3/1999 | Eisenberg et al. | |
| 5,897,634 A | 4/1999 | Attaluri et al. | |
| 5,915,249 A | 6/1999 | Spencer | |
| 5,933,593 A | 8/1999 | Arun et al. | |
| 5,963,937 A | 10/1999 | Yamasaki et al. | |
| 5,963,954 A | 10/1999 | Burrows | |
| 6,009,271 A | 12/1999 | Whatley | |
| 6,014,673 A | 1/2000 | Davis et al. | |
| 6,023,723 A | 2/2000 | McCormick et al. | |
| 6,055,515 A | 4/2000 | Consentino et al. | |
| 6,067,547 A * | 5/2000 | Douceur | 1/1 |
| 6,070,165 A | 5/2000 | Whitmore | |
| 6,081,875 A | 6/2000 | Clifton et al. | |
| 6,112,209 A | 8/2000 | Gusack | |
| 6,122,627 A | 9/2000 | Carey et al. | |
| 6,173,292 B1 | 1/2001 | Barber et al. | |
| 6,226,632 B1 | 5/2001 | Takahashi et al. | |
| 6,233,583 B1 | 5/2001 | Hoth | |
| 6,314,417 B1 | 11/2001 | Bennett et al. | |
| 6,321,235 B1 | 11/2001 | Bird | |
| 6,330,565 B1 | 12/2001 | Nesbitt | |
| 6,353,825 B1 | 3/2002 | Ponte | |
| 6,353,833 B1 | 3/2002 | Bird et al. | |
| 6,363,488 B1 | 3/2002 | Ginter et al. | |
| 6,446,062 B1 | 9/2002 | Levine et al. | |
| 6,457,021 B1 | 9/2002 | Berkowitz et al. | |
| 6,493,703 B1 | 12/2002 | Knight et al. | |
| 6,496,831 B1 | 12/2002 | Baulier et al. | |
| 6,507,847 B1 | 1/2003 | Fleischman | |
| 6,546,390 B1 | 4/2003 | Pollack et al. | |
| 6,564,215 B1 | 5/2003 | Hsiao et al. | |
| 6,574,639 B2 | 6/2003 | Carey et al. | |
| 6,591,266 B1 | 7/2003 | Li et al. | |
| 6,598,119 B2 | 7/2003 | Becker et al. | |
| 6,609,126 B1 | 8/2003 | Smith et al. | |
| 6,618,732 B1 | 9/2003 | White et al. | |
| 6,757,690 B2 | 6/2004 | Aldrich et al. | |
| 6,826,560 B1 | 11/2004 | Leymann et al. | |
| 6,865,658 B2 | 3/2005 | Tomori et al. | |
| 6,874,001 B2 | 3/2005 | Narang et al. | |
| 6,877,014 B1 | 4/2005 | Kasamsetty et al. | |
| 6,947,956 B2 | 9/2005 | Olstad et al. | |
| 6,957,237 B1 | 10/2005 | Traversat et al. | |
| 6,970,872 B1 | 11/2005 | Chandrasekaran et al. | |
| 7,013,469 B2 | 3/2006 | Smith et al. | |
| 7,017,162 B2 | 3/2006 | Smith et al. | |
| 7,047,401 B2 | 5/2006 | Seal et al. | |
| 7,062,480 B2 | 6/2006 | Fay et al. | |
| 7,103,607 B1 | 9/2006 | Kirkwood et al. | |
| 7,107,260 B2 | 9/2006 | Nakamura et al. | |
| 7,149,760 B1 | 12/2006 | Breuer | |
| 7,222,117 B1 * | 5/2007 | McGrogan | 1/1 |
| 7,246,137 B2 | 7/2007 | Paulus et al. | |
| 7,277,900 B1 | 10/2007 | Ganesh et al. | |
| 7,333,952 B1 | 2/2008 | Neyman et al. | |
| 7,403,906 B2 | 7/2008 | Coleman | |
| 7,487,550 B2 | 2/2009 | Todd | |
| 7,529,728 B2 * | 5/2009 | Weissman et al. | 1/1 |
| 7,543,003 B2 | 6/2009 | Shukla et al. | |
| 7,634,520 B1 | 12/2009 | Seiler et al. | |
| 7,644,088 B2 | 1/2010 | Fawcett et al. | |
| 7,836,031 B2 | 11/2010 | Howard et al. | |
| 8,078,514 B2 | 12/2011 | Dias et al. | |
| 8,291,269 B1 | 10/2012 | Ro et al. | |
| 8,326,876 B1 * | 12/2012 | Venkataraman et al. | 707/784 |
| 8,332,349 B1 | 12/2012 | Wilson | |
| 8,458,217 B1 | 6/2013 | McGrogan et al. | |
| 8,473,469 B1 * | 6/2013 | Yancey et al. | 707/703 |
| 8,504,556 B1 * | 8/2013 | Rice et al. | 707/713 |
| 8,572,063 B2 * | 10/2013 | Plattner et al. | 707/706 |
| 8,725,711 B2 | 5/2014 | O'Reilly et al. | |
| 2001/0021930 A1 | 9/2001 | Bouve et al. | |
| 2001/0049685 A1 | 12/2001 | Carey et al. | |
| 2002/0010700 A1 | 1/2002 | Wotring et al. | |
| 2002/0026448 A1 | 2/2002 | Bird et al. | |
| 2002/0087500 A1 | 7/2002 | Berkowitz et al. | |
| 2002/0107853 A1 | 8/2002 | Hofmann et al. | |
| 2002/0116380 A1 | 8/2002 | Chen et al. | |
| 2002/0128734 A1 | 9/2002 | Dorsett | |
| 2002/0128947 A1 | 9/2002 | Sauter et al. | |
| 2002/0136381 A1 | 9/2002 | Shaffer et al. | |
| 2002/0138497 A1 | 9/2002 | Chen et al. | |
| 2002/0143763 A1 | 10/2002 | Martin, Jr. et al. | |
| 2002/0194037 A1 | 12/2002 | Creed et al. | |
| 2003/0014490 A1 | 1/2003 | Bates et al. | |
| 2003/0018616 A1 | 1/2003 | Wilbanks et al. | |
| 2003/0041050 A1 | 2/2003 | Smith et al. | |
| 2003/0050929 A1 | 3/2003 | Bookman et al. | |
| 2003/0120638 A1 | 6/2003 | Park et al. | |
| 2003/0131013 A1 | 7/2003 | Pope et al. | |
| 2003/0187813 A1 | 10/2003 | Goldman et al. | |
| 2003/0187851 A1 | 10/2003 | Fay et al. | |
| 2003/0204504 A1 | 10/2003 | Stuy et al. | |
| 2003/0221068 A1 | 11/2003 | Tsuji et al. | |
| 2003/0225662 A1 | 12/2003 | Horan et al. | |
| 2003/0229650 A1 | 12/2003 | Olstad et al. | |
| 2003/0236768 A1 | 12/2003 | Sribhibhadh et al. | |
| 2004/0015470 A1 | 1/2004 | Smith et al. | |
| 2004/0015473 A1 | 1/2004 | Trappen et al. | |
| 2004/0015487 A1 | 1/2004 | Lin et al. | |
| 2004/0015489 A1 | 1/2004 | Anonsen et al. | |
| 2004/0015496 A1 | 1/2004 | Anonsen | |
| 2004/0015506 A1 | 1/2004 | Anonsen et al. | |
| 2004/0015516 A1 | 1/2004 | Harter et al. | |
| 2004/0015814 A1 | 1/2004 | Trappen et al. | |
| 2004/0019599 A1 | 1/2004 | Trappen et al. | |
| 2004/0024638 A1 | 2/2004 | Restis | |
| 2004/0024692 A1 | 2/2004 | Turbeville et al. | |
| 2004/0088117 A1 | 5/2004 | Dorsett | |
| 2004/0176967 A1 | 9/2004 | Whittenberger | |
| 2004/0181440 A1 | 9/2004 | Yeh et al. | |
| 2004/0181502 A1 | 9/2004 | Yeh et al. | |
| 2004/0181538 A1 | 9/2004 | Lo et al. | |

(56) References Cited

U.S. PATENT DOCUMENTS

| | | | |
|---|---|---|---|
| 2004/0205048 A1 | 10/2004 | Pizzo et al. | |
| 2005/0010394 A1 | 1/2005 | Bergeron et al. | |
| 2005/0033583 A1 | 2/2005 | Bergeron et al. | |
| 2005/0071362 A1 | 3/2005 | Nelson et al. | |
| 2005/0108262 A1 | 5/2005 | Fawcett et al. | |
| 2005/0114409 A1 | 5/2005 | Sinha et al. | |
| 2005/0120062 A1 | 6/2005 | Sinha et al. | |
| 2005/0131935 A1 | 6/2005 | O'Leary et al. | |
| 2005/0203871 A1 | 9/2005 | Devalla et al. | |
| 2005/0204001 A1 | 9/2005 | Stein et al. | |
| 2005/0209876 A1 | 9/2005 | Kennis et al. | |
| 2006/0173672 A1 | 8/2006 | Bergeron et al. | |
| 2006/0173769 A1 | 8/2006 | Vales | |
| 2007/0005665 A1 | 1/2007 | Vaitzblit et al. | |
| 2007/0038641 A1 | 2/2007 | Fawcett et al. | |
| 2007/0083569 A1 | 4/2007 | Wong et al. | |
| 2007/0112756 A1 | 5/2007 | Wen et al. | |
| 2007/0118394 A1 | 5/2007 | Cahoon | |
| 2007/0118498 A1 | 5/2007 | Song et al. | |
| 2007/0174331 A1 | 7/2007 | Wolf et al. | |
| 2008/0134211 A1 | 6/2008 | Cui | |
| 2009/0019179 A1* | 1/2009 | McGeachie et al. | 709/238 |
| 2009/0182780 A1 | 7/2009 | Wong et al. | |
| 2011/0246434 A1* | 10/2011 | Cheenath et al. | 707/703 |
| 2013/0024835 A1* | 1/2013 | Stein et al. | 717/103 |
| 2013/0159187 A1* | 6/2013 | Demirjian | 705/44 |
| 2013/0173669 A1* | 7/2013 | Tang et al. | 707/803 |
| 2013/0254173 A1* | 9/2013 | Cotner et al. | 707/704 |
| 2013/0297655 A1* | 11/2013 | Narasayya et al. | 707/791 |

OTHER PUBLICATIONS

Wasson, Mark "Large-scale Controlled Vocabulary Indexing for Named Entities", Proceedings of the Sixth Conference on applied Natural Language Processing, Apr. 29, 2000, May 4, 2000 (pp. 276-281).

McCallum, A Information Extraction: distilling structured data from unstructured text:, ACM Queue ACM USA, vol. 3, No. 9, Nov. 2005 (pp. 48-57).

Neeta Garimella, "Understanding and Exploiting Snapshot Technology for Data Protection, Part 1: Snapshot Technology Overview", IBM developerWorks blog, posted Apr. 26, 2006, pp. 1-7.

Vassilis J. Tsotras & Nickolas Kangelaris, "The Snapshot Index: An I/O-Optimal Access Method for Timeslice Queries", Elsevier Science Ltd. (1995), Information Systems, 20(3):237-260.

Berthold Reinwald et al., "Storing and Using Objects in a Relational Database", IBM Systems Journal (1996), 35 (2):172-191.

Kinsley, K.C. and Hughes, C.E., Analysis of a Virtual Memory Model for Maintaining Database Views, IEEE Transactions on Software Engineering, May 1992, pp. 402-409, vol. 18, Issue 5 (abstract only).

Birrell, A., Jones, M. and Wobber, E., A Simple and Efficient Implementation of a Small Database, ACM Symposium on Operating Systems Principles archive, 1987, pp. 149-154 (abstract only).

Traiger, Irving L., Virtual Memory Management for Database Systems, ACM SIGOPS Operating Systems Review archive, 1982, pp. 26-48, vol. 16, Issue 4, ACM Press, New York, NY (abstract only).

Ji, Minwen, Affinity-based Management of Main Memory Database Clusters, ACM Transactions on Internet Technology (TOIT) archive, 2002, pp. 307-339, vol. 2, Issue 4.

Dionn, IronEye Cache—Default branch, Freshmeat.net, May 30, 2003 12:08 PST (abstract only).

Hoverd, Tim, Livestore—Default branch, Freshmeat.net, Oct. 23, 2002 10:22 PST (abstract only).

Darling, Aaron, mpiBLAST—Default branch, Freshmeat.net, Feb. 11, 2003 19:55 PST (abstract only).

No author listed, twz1dbcForMysql—Default branch, Freshmeat.net, Aug. 1, 1998 22:04 PST (abstract only).

"Microsoft SQL Server 2005 Product Overview," by Dumler, Michelle. (2005).

U.S. Appl. No. 11/331,389, filed Jan. 12, 2006.

U.S. Appl. No. 12/546,205, filed Aug. 24, 2009.

U.S. Appl. No. 13/237,240, filed Sep. 20, 2011.

U.S. Appl. No. 13/295,697, filed Nov. 14, 2011.

International Search Report and Written Opinion of the International Searching Authority for PCT/US2004/038641 dated Feb. 17, 2005.

Chen, P., "The Entity-Relationship Model—Toward a Unified View of Data," ACM Transactions on Database Systems, 1(1): 9-36 (Mar. 1976).

* cited by examiner

MULTI-TENANT IN-MEMORY DATABASE (MUTED) SYSTEM AND METHOD

FIELD OF THE INVENTION

Embodiments of the present application relate to computer systems. More specifically, embodiments relate to computer systems for supporting a multiplicity of independent databases.

BACKGROUND OF THE INVENTION

In the information age, databases are a precious commodity, storing immense quantities of data for use in various applications. Latency, or time needed to access stored database data, is a crucial metric for many performance-intensive applications. Portfolio management applications, for example, are generally performance-intensive.

In-memory databases are the fastest possible databases. In such databases, which place the dataset in main memory, any piece of information is available with almost zero latency. The memory requirements of such databases increase with the size of the stored dataset. Therefore, such databases become excessively expansive from a hardware perspective when datasets are very large. In addition, computer manufacturers limit the amount of memory that can be installed in their machines which limits the maximum size of the dataset that can be stored.

Some database systems address this memory problem by using software to cache portions of the dataset in main memory while keeping the majority in secondary memory (i.e., secondary storage), such as on disk. While this approach solves one problem, it creates another: complex software must keep track of the location of the objects being stored, moving copies of the in-memory objects back and forth from the disk. This approach also increases complexity and latency, as software must determine where to look for the object in-memory or on disk. In addition, desired data must be copied to the application's memory space because, for data integrity and functional reasons, users cannot be allowed direct access to the database copy of the object, whether it is found in the memory cache or on the disk.

By transparently mapping data into and out of main memory, instead of copying the data into main memory, data can be accessed at speeds close to those achievable if the data were in main memory without requiring the copying of the data into and out of main memory. This approach is exemplified by the system described in U.S. Pat. No. 7,222,117 by McGrogan, entitled "Segmented Global Area Database", the entirety of which is herein incorporated by reference. A Segmented Global Area Database may be referred to as a SAGA database herein.

Improvements to the SAGA database to support an unlimited number of simultaneous reading and writing processes on a multiplicity of computers are disclosed in U.S. Pat. No. 8,291,269, to Ro, et al., entitled "MULTI-WRITER IN-MEMORY COPYING DATABASE (MIND) SYSTEM AND METHOD", the entirety of which is herein incorporated by reference. Additional improvements to the SAGA database to allow multiple databases to be quickly attached and detached from each other are disclosed in U.S. Pat. No. 8,458,217, to McGrogan, et al., entitled "INSTANTLY BUILT INFORMATION SPACE (IBIS)," the entirety of which is herein incorporated by reference.

A need exists to provide host-tenant functionality to the SAGA database. Additional need exists to allow tenants to modify and add data to host data sets within a database.

DESCRIPTION OF THE FIGURES

The features and advantages of embodiments of the present application can be understood by reference to the description herein taken with the following figures including embodiments of the invention.

DETAILED DESCRIPTION

Figure 1:
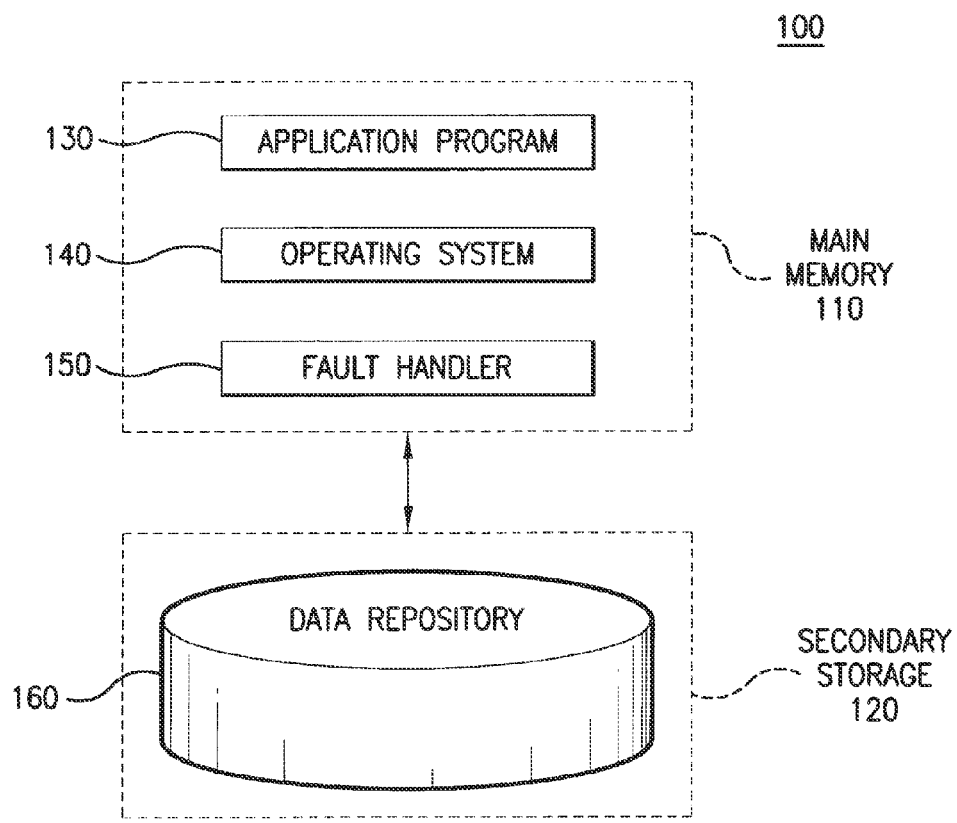
FIG. 1 depicts an exemplary hardware and software schema for a Segmented Advent Global Area (SAGA) database and an Instantly Built Information Space (IBIS)

Embodiments of the present invention may be referred to as Multi-Tenant In-Memory Database systems and methods, otherwise referred to as MUTED systems and methods.

For the first time, embodiments of the present application provide support for a multiplicity of independent database tenants who share a common pool of data objects, while also providing access to objects that are exclusive to the individual tenants.

Embodiments of the present invention extend the SAGA database to allow one or more tenants of a database to modify the appearance of objects in the common pool while making the modifications visible only to the tenant that made the modification. If the database host modifies members of the common data objects, the changes may be visible to all tenants. If a tenant has made changes to the same object as that modified by the host, the tenant continues to see the modified version of the database object. The present system allows multiple, non-conflicting changes to be made concurrently to a database, such as, for example, a persistent database of C++ objects. The present system allows a database to be accessed simultaneously by a multiplicity of reading processes located on a multiplicity of computers without the need for read locks. All users, whether host or tenant users, are given access to the original objects, not copies of the objects, so all objects contained in the database are accessible at memory speeds, and each object has the full virtual functionality of a normal database object. The integrity of the underlying database is protected by the computer hardware itself.

The present system extends the functionality of a Segmented Advent Global Area (SAGA) database by providing the ability to host multiple tenants. Tenants may have access to reference data provided by a host and may be able to add additional data, visible only to the tenant. In some embodiments, a tenant may be able to modify the appearance of the data that the host provides to the tenant. Modifications made by a tenant are visible only to that tenant, and are not visible to either the host or other tenants.

For example, in one embodiment, a Geneva fund administrator may comprise a host. The Geneva fund administrator may host a number of hedge funds as tenants. The tenant hedge funds may have access to the Geneva fund administrator's definitions and investment prices through a SAGA database populated by a plurality of database objects. Each of the tenant hedge funds may add trades, modify definitions and/or investments, or remove trades while maintaining a complete working environment. A tenant hedge fund may be able to change the appearance of a host provided database object, such as, for example, changing investment asset types if the tenant hedge fund desires to characterize the tenant's holdings in a different way than the Geneva fund administrator. The change in the host provided database object may be visible only to the tenant that made the change.

In some embodiments, tenant-modified objects may supersede host database objects. For example, if a tenant modifies its view of the appearance of a host-provided object and the host subsequently updates the object, the modifications made by the tenant will be maintained, since the tenant-modified object supersedes the host object. Tenant-modified objects may supersede host objects on a member-by-member basis.

The MUTED system greatly reduces memory requirements compared to traditional systems that require individual tenant databases to run simultaneously with replicated data. A host may provide tenants with up-to-date reference data as a service, while allowing the tenants to customize the provided data. When a host updates host reference data, all tenants receive the benefit simultaneously, without the need to update replicated copies, which reduces maintenance issues and facilitates cross-tenant reporting.

The MUTED system reduces database computer memory impact by sharing common data objects with a multiplicity of tenant users. Sharing common data objects may allow tenants to establish their own working environment without having to enter large quantities of reference data. The MUTED system allows tenants to modify the appearance of the common data objects, if needed, with little additional overhead. For example, if the MUTED system is implemented in the Geneva World Investor system, tenants may enter data pertaining to their own financial trading while completely leveraging the referential data provided by the host.

Although various embodiments herein are discussed in connection with investment portfolio management systems, it is to be appreciated that the present teachings may be implemented in any context which utilizes databases, such as, for example, a trade order management system (TOMS) or partnership accounting system.

Various embodiments described herein may be implemented in conjunction with the Geneva Segmented Advent Global Area (SAGA). Geneva SAGA is a portfolio management system that is used by institutions involved in the trading of investments. Geneva SAGA is a product of Advent Software, Inc. of San Francisco, Calif.

FIG. 1 depicts an exemplary hardware and software schema for a SAGA database and a Multiple-Tenant In-Memory Database (MUTED). The schema 100 may include a main memory 110 and a secondary storage 120. Resident in the main memory 110 may be an application program 130, an operating system 140, and a fault handler 150. The secondary storage 120 may include a data repository 160.

The application program 130 may be programmed to access the data repository 160. The fault handler 150 may be associated with the data repository 160 and registered with the operating system 140. In one embodiment, the fault handler 150 may not be native to the operating system 140, which may include its own fault handlers. Instead, the fault handler 150 may be written particularly to enable interactions between the application program 130 and the data repository 160.

In one embodiment, the data repository 160 may include various file segments. At any one time, some file segments may be mapped into the main memory 110 while other segments may not be mapped. The file segments in the data repository 160 may represent a SAGA database.

In one embodiment, when the application program 130 references an object that resides in the data repository 160, but is not currently mapped into the main memory 110, a segmentation fault may be issued by the computer hardware at an interrupt location in the application program 130. The fault handler 150 may be able to catch the segmentation fault. The fault handler 150 may then find a file segment of the data repository 160 that corresponds to the referenced object. That file segment may be mapped into the main memory 110, and the application program 130 may be restarted at the interrupt location.

In one embodiment, various software components of the schema 100 may be written in an object-oriented programming language, such as C++ or another such language.

Figure 2:
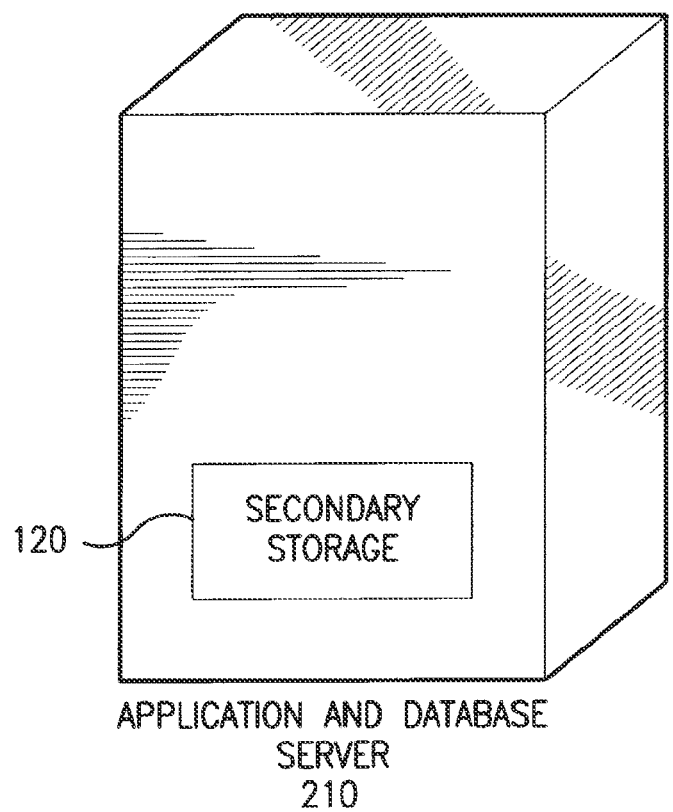
FIG. 2 depicts an exemplary system for a SAGA database and Multi-Tenant In-Memory Database (MUTED)

FIG. 2 depicts an exemplary system for a MUTED system. The system 200 may be an example hardware implementation of the schema 100 of FIG. 1.

The system 200 may include an application and database server 210. The server 210 may include the secondary storage 120, and may provide a platform for the application program 130, the operating system 140, and the fault handler 150 (not shown) of the schema 100 in FIG. 1. The system 200 may be implemented on one or multiple computers and/or storage devices.

In one embodiments, the system 200 may run on any computer that can run 64-bit Solaris version 8, 9, or 10, including, for example, any current SPARC platform such as Sun UltraSPARC or Fujitsu computer systems, or any x86-64 based platform using processors such as AMD®'s Opteron™ or Intel®'s Xeon®, Core™ 2, or Core™ i7 platforms. Embodiments herein may be implemented on any computer hardware/software systems that support virtual memory, allow user programs to catch segmentation violations, and allow catching routines to restart a faulting application by retrying the instruction that caused the segmentation violation. For example, embodiments may involve POSIX-compliant systems, such as all varieties of Linux systems, Apple's MacOS X, Sun's Solaris, Microsoft NT, and its derivates such as Windows 2000 and XP, and Microsoft Windows 7. In addition, the computer hardware of the system 200 may support 64-bit addressing, with at least 40 bits actually supported by the memory-mapping unit of that hardware. Accordingly, the system 200 may directly access one terabyte of data. The larger the number of bits actually supported by the memory-mapping unit, the greater the size of the supported database. Sun SPARC systems, for example, support a 44-bit memory mapping unit, which means that such systems may provide immediate access to 16 terabytes of data. In an exemplary embodiment, the computer I/O system of the system 200 can provide at least 3 megabytes/second of data transfer.

Returning to the schema 100 of FIG. 1, in an exemplary embodiment, data may be stored in the data repository 160 in the form of interconnected C++ objects. The objects may be accessed directly by an executing C++ program (e.g., the application program 130) and used as if they were part of the program's local memory. All the stored objects may be directly interconnected by memory pointers into one large matrix of information. Only rarely is information searched for as in the classic database model, since almost all information may already be pre-linked in the patterns in which it will be used. Unlike relational databases, which may use redundant data tables to represent these pre-linkages, any given data object in the data repository 160 may be stored only once. This may greatly reduce the total amount of storage required, may eliminate database internal consistency problems, and may simplify software development.

In an exemplary embodiment, each object in the data repository 160 may have knowledge times (time stamps) associated therewith, indicating when the object was first entered in the database and when it became invalid. Data may become invalid when it is deleted (expired) or updated (superseded by a new variant). This temporal information may allow the user to effectively move in time, permitting the reproduction of reports as they would have appeared at any time in the past. In an exemplary embodiment, each object may have a header defining such knowledge times.

The application program 130 may attach to the in-memory data repository 160 and map that repository into the virtual memory space of the application program 130. It may then access the repository objects as if all of them were part of its own memory. The repository objects need not be copied before being given to the application program 130 since they are protected from alteration by memory hardware. An unlimited number of copies of the application program 130 may attach to this shared memory simultaneously. Only one copy may write at any one instant.

Inside each object may be a virtual function pointer that points to a shared memory area that holds the virtual function tables, including virtual functions associated with object types. This pointer technique may allow a data repository object to work transparently for any application that touches it, regardless of where in memory an operating system loader places the virtual function tables. When an application attaches to the data repository 160, a startup routine may copy the virtual function table from the application to a specific address in the shared memory, based on an ObjectType field that is stored in each object. Each object in the data repository 160 may have had its virtual function pointer altered to point to this specific address when it was placed into the data repository 160. Accordingly, each object may now automatically find the correct virtual function definitions for the application that is using it, even if they have changed from the time when the object was originally placed in the KnowledgeBase.

Each object also may have a pointer to itself. This may allow an object to be asked for its shared memory address, no matter if the object is already in shared memory or is a local copy. The code may not need to worry about the actual residency of the object because it may always get a consistent answer.

Objects may be associated with each other by links In an implementation, there may be three types of linkages in the data repository 160. Y Nodes may define the start of like types of objects; X Nodes may connect to particular object instances; and Z Nodes may be implicit in the objects themselves, pointing from one variant of an object to the next. (Y Nodes may actually contain the first X Node as part of themselves. They are described separately below to more clearly reveal the underlying paradigm.) Linkages may come in a number of variations: zero-or-once, once, once-or-many, zero-or-once-or-many. For example, in a portfolio management embodiment, a Buy may buy one and only one Investment. The link between a Buy and an Investment may therefore be of type "once". Linkage variation rules may be enforced at the time that objects or links are placed into the data repository 160.

In another example, the Buy of a stock may be made in terms of US Dollars (USD). To represent this relationship, the Buy object may be linked to the MediumOfExchange object USD by an X node. Each X node has may have its own KnowledgeBegin and KnowledgeEnd dates, as two objects that have independent existence may be linked to each other for a given period of time and then that linkage may be terminated. For example, BMW was originally traded in Deutsche Marks (DM), but is now traded in Euros (EU). The default trading currency linkage for BMW originally pointed to DM, but that X node link was expired and a new one was added pointing to EU.

In an embodiment, each object in the data repository 160 may have any number of header fields that may identify the object, its virtual functions, where it is stored, and how to detect if it has been corrupted. The header may contain the following example fields:

| Field | Description |
| --- | --- |
| ObjectType | Identifies the class of this object. (A maximum of 65,000 object types may be supported.) |
| ObjectSync | A 16-bit pattern chosen by statistical analysis to be least likely to appear in a KnowledgeBase. Used to assist in identifying the start of objects if data corruption occurs. |
| SegmentID | Associates this object with a particular repository segment. The default value for this field is zero. |
| Vpointer | C++ creates this field, which is a pointer to the virtual function table. The data repository 160 rewrites this pointer, when the object is being stored, so that each class's objects always point to a specific shared memory address. This allows an object to be given directly to many applications. |
| TreeCursor | Points to a unique X node, which, in turn, points to the first object in a stack of temporal variations of the same object. |
| Roles | Set of 32, 2-bit, user-role masks determining which user roles can read, write, or delete this object. |
| HashKey | A 16-bit numerical value that provides fast go/no-go matching when looking through a pile of objects for one that matches a given primary key. |
| CheckSum | A 32-bit value that is initially computed when an object is placed in memory. If the object and its checksum begin to disagree, memory corruption has occurred. |
| ObjectId | A unique value assigned to this object. This field can be used to identify this object to external systems. |
| RefCounter | Number of other objects pointing to this object. |
| NextItem | Pointer to next temporal variant of this object. (Newest first.) |
| ShmAddress | Pointer to this object's location in shared memory. |
| KnowledgeBeginDate | Date this object was placed in KnowledgeBase. |

-continued

| | |
|---|---|
| KnowledgeEndDate | Date this object was either deleted or replaced by a new variant. |

Figure 3:
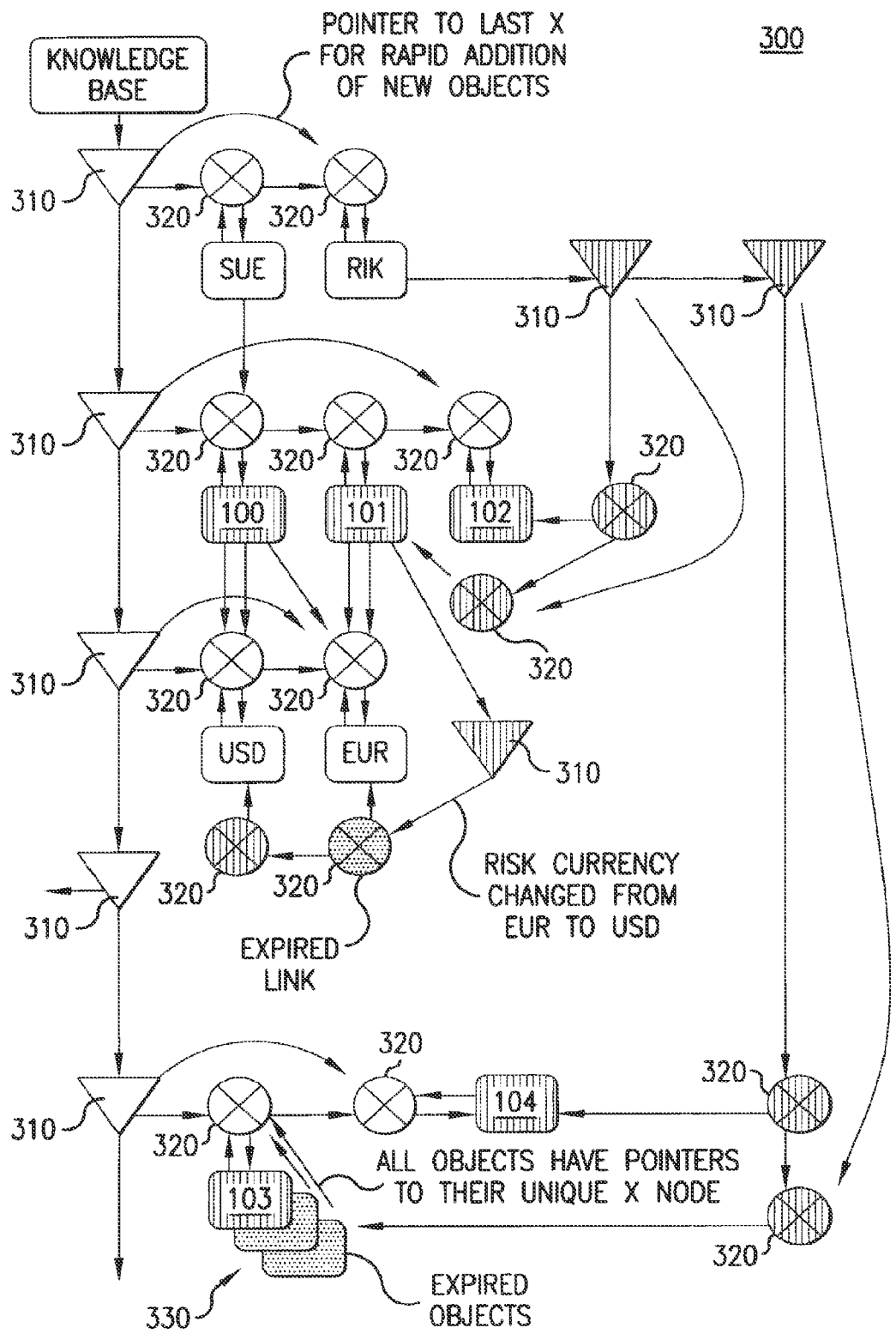
FIG. 3 depicts an exemplary structure for a SAGA database.

FIG. 3 depicts an exemplary structure for a SAGA database. The structure 300 may represent how various different objects are linked together in the data repository 160 by the application program 130. The structure 300 is not comprehensive and is merely illustrative of an example structure in a portfolio management database.

Y Nodes 310 are shown as triangles, X Nodes 320 as circles with X's in them, and Z nodes 330 are represented by variants stacked vertically, such as Deposit 103. The gray objects are in specific Portfolio repository memory segments, and non-gray objects are in the default segments (described below).

Examples of types of inter- and intra-object pointers are shown in FIG. 3. Since all the objects may be linked directly by memory pointers, an application such as the application program 130 may navigate from one data object to another at full memory speed. No "database" operations may be required.

A single object may have dozens of linkages to other repository objects. In an embodiment, since these linkages would quickly come to dominate the storage space, objects that are linked "once" to another object, with no variations in the link, may point to a special X Node, called a "unique" X Node. There may be one "unique" X Node for each object linked to the main KnowledgeBase object. This may be especially valuable in an example investment setting which has six different pointers to a MediumOfExchange. All of these pointers may generally be invariant, and all may normally point to the same object. These pointers may be PriceDenomination, BifurcationCurrency, RiskCurrency, IncomeCurrency, PrincipalCurrency, and PriceCrossingCurrency.

Figure 4:
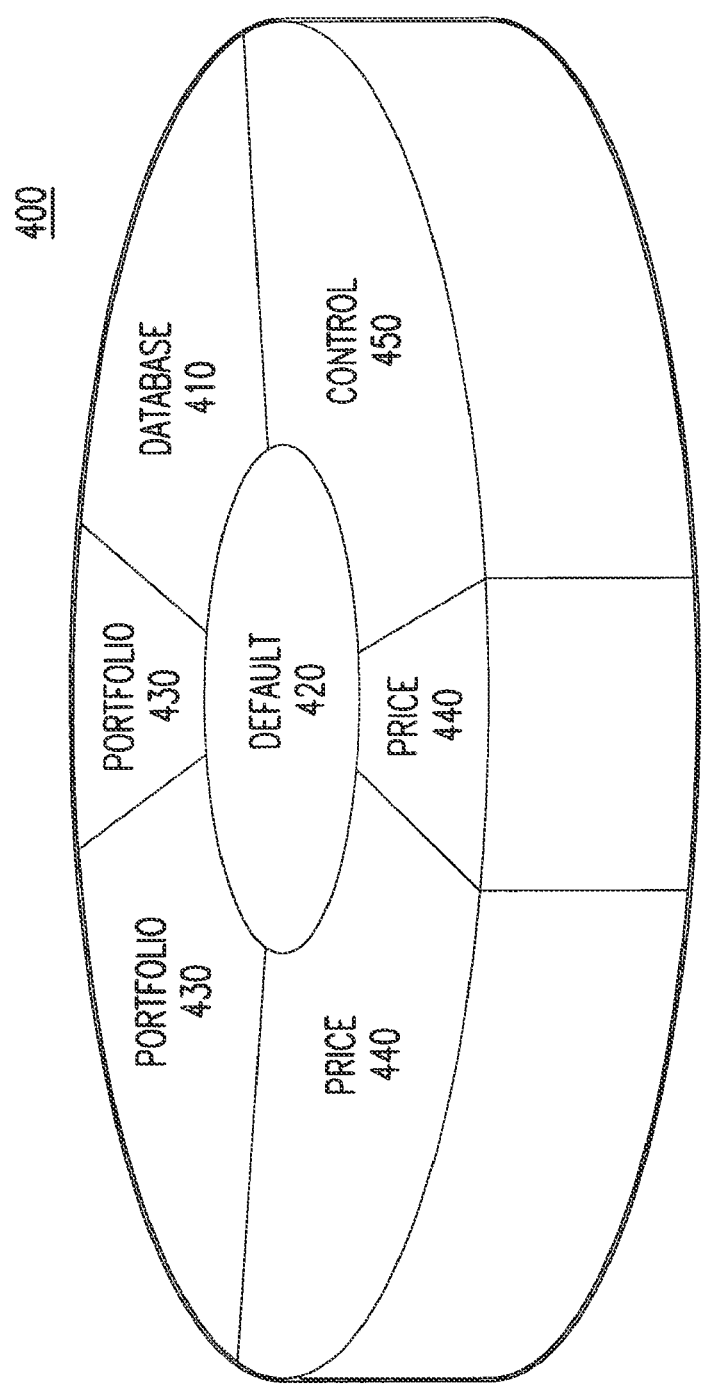
FIG. 4 depicts an exemplary repository for a SAGA database.

FIG. 4 depicts an exemplary repository for a SAGA database. The data repository 400 may be a logical representation, showing example kinds of data segments in a portfolio management application.

In an example embodiment, there may be five types of data segments in the data repository 400: database, default (or core), portfolio, price, and control. The database segment 410 may hold those objects that define the database. This segment may include the database log file write buffer, the current database status, and Segment and Segment File objects that point to all the other segments in the data repository 400.

The price segments 440 may contain all non-MediumOfExchange PriceDay objects as well as links to them. Each price segment 440 may represent one month of prices for all investments in the associated portfolio management application. The price segments 440 may appear as files to the system, with names containing the year and month in human-readable format.

The portfolio segments 430 may hold all the transactions for individual portfolios as well as the links pointing to them, all objects owned by them, and all links pointing to those owned objects. (For example, Reorganization transactions own ReorganizationElements. These ReorganizationElements and the links to their Reorganization parents are all in the same segment as the Reorganization that owns them.) In an embodiment, if the objects are linked to the main KnowledgeBase object, those links may not be placed in the portfolio segments. The Portfolio objects themselves may also not be placed in the segments so that they can be searched without paging through the portfolio segments.

The control segment 450 may store all the UserSession and Agent objects that track usage of the KnowledgeBase. There may be only one control segment 450, just as there may be only one database segment 410.

The default (or core) segment 420 may hold everything that is not placed in any other segment. In an embodiment, the default segment 420 may hold about 10-20% of the data.

In an embodiment, a hash table (not shown) may reside in the default segment 420. This table allows rapid object access given either primary or secondary keys. Not all object types may have entries in this table. Only those that potentially are numerous and might be searched for by key may be indexed here. For example, users may look for a particular PortfolioEvent by using a secondary key that they have provided. This table may immediately locate the matching event. The table also may be used to ensure that all primary and secondary keys are unique when a new object is entered into the KnowledgeBase.

In an embodiment, objects stored in the memory-mapped file segments of the data repository 160 (FIG. 1) or 400 (FIG. 4) may be divided into groups, called species. Example species may include Prices, PortfolioEvents, control objects (Agents, UserSessions), derived numerical results (such as Time Weighted Return (TWR) values), and core objects (everything else). An individual segment may only contain objects of a particular single species. While the species may define the segmentation scheme, an individual within a species may be referred to as a specimen. For example, each portfolio's events may constitute a specimen of the PortfolioEvent species. Each PriceMonth may constitute a specimen of the Price species.

In a particular embodiment, memory-mapped file segments may range from 1 to 16 megabytes in size. Segments may grow automatically from minimum to maximum size as objects are added to them, overflowing into new segments if 16 megabytes is insufficient.

In an embodiment, a user-specified maximum number of segments from each species may be held in memory. These segments may be evicted from memory on a least recently-used (LRU) basis. Segments may be placed in memory whenever objects that they contain are referenced by the application program 130. The system may run with as little as one segment from any species in memory. As such, a user may have total freedom in defining the number of segments that may be concurrently mapped at any one moment.

In an embodiment, to support the splitting of a data repository into segments, object insertion routines may test virtual functions that specify how each object type is to be handled during insert. For example, portfolio-related events may be stored in clusters that are mapped together in memory based on their associated portfolio.

In an example implementation, when a portfolio is added to the data repository, it may be assigned a 16-megabyte address at which to start storing its events. This address may be a direct function of the segment identifier that is placed in the Portfolio object. All events associated with this Portfolio may be placed in this allocated memory. Assuming a 44-bit virtual address space, such as provided by SPARC CPUs, more than 1,000,000 Portfolios are supported, each holding about 40,000 events. It is to be understood that reducing the 16-megabyte default size for a segment may increase the maximum number of portfolios that can be supported. In a setting that hosts tens of millions of small, relatively inactive portfolios, such a reduction may be particularly valuable.

If the 16 megabyte area reserved for the portfolio is filled, a new, not necessarily contiguous, allocation may be created, and filling of the allocated space resumes. In this way, there is no limit to the size of the stored portfolio. Segment memory may not be completely zeroed when it is allocated; thus, no page faults occur in the unused memory. In an embodiment, a segment address allocation algorithm may involve a highest segment address. The highest segment address may be stored in a database object as a reference. When a new segment is required, it may be allocated from this address, and the address may then be incremented by 16 megabytes.

When an application process attempts to access memory associated with a portfolio, memory that is not already mapped may cause a segmentation violation (SIGSEGV). The fault handler may then determine if this is a true memory access error or just a request for a segment that is not yet in memory. If the SIGSEGV results from a segment request, the handler may memory-map the segment and restart the operation.

In an embodiment, although memory space is allocated in 16-megabyte segments, the underlying mapped files may be created and extended in smaller segments, such as 1-megabyte segments. Such a partial allocation approach may greatly lessen the physical disk space needed to store thousands of small Portfolios and reduces backup and file transfer times.

Processes may detach the segments that they are no longer using. A maximum memory usage may be enforced where segments are unmapped in a least-recently-used (LRU) manner whenever a user-specified limit is reached. In a portfolio management embodiment, only a few months of prices may need to be mapped into memory at any given time.

In an example implementation, the data repository 160 or 400 holding mapped data segments may be stored on a disk subsystem that is connected to a NFS (Network File System) or similar network. Accordingly, the mapped files of the data repository may be accessible via NFS from multiple remote computers simultaneously. As such, users who have numerous small computers may team the computers to satisfy large batch processing requirements. Such remote processing may be further facilitated by the fact that the network need only transport those data segments that are needed by the remote computers. Such an implementation may be scalable, enabling databases to grow extremely large, not limited by hardware memory constraints and associated cost factors.

It is to be appreciated that, because users can leverage existing networks of computers to accelerate batch runs, TCO (Total Cost of Ownership) may be lowered, and batch cycle completion times may be improved. In addition, troubleshooting of database problems may be performed more rapidly and responsively, as less data needs to be transferred, and tests may be performed using smaller, more readily available computers.

Figure 5:
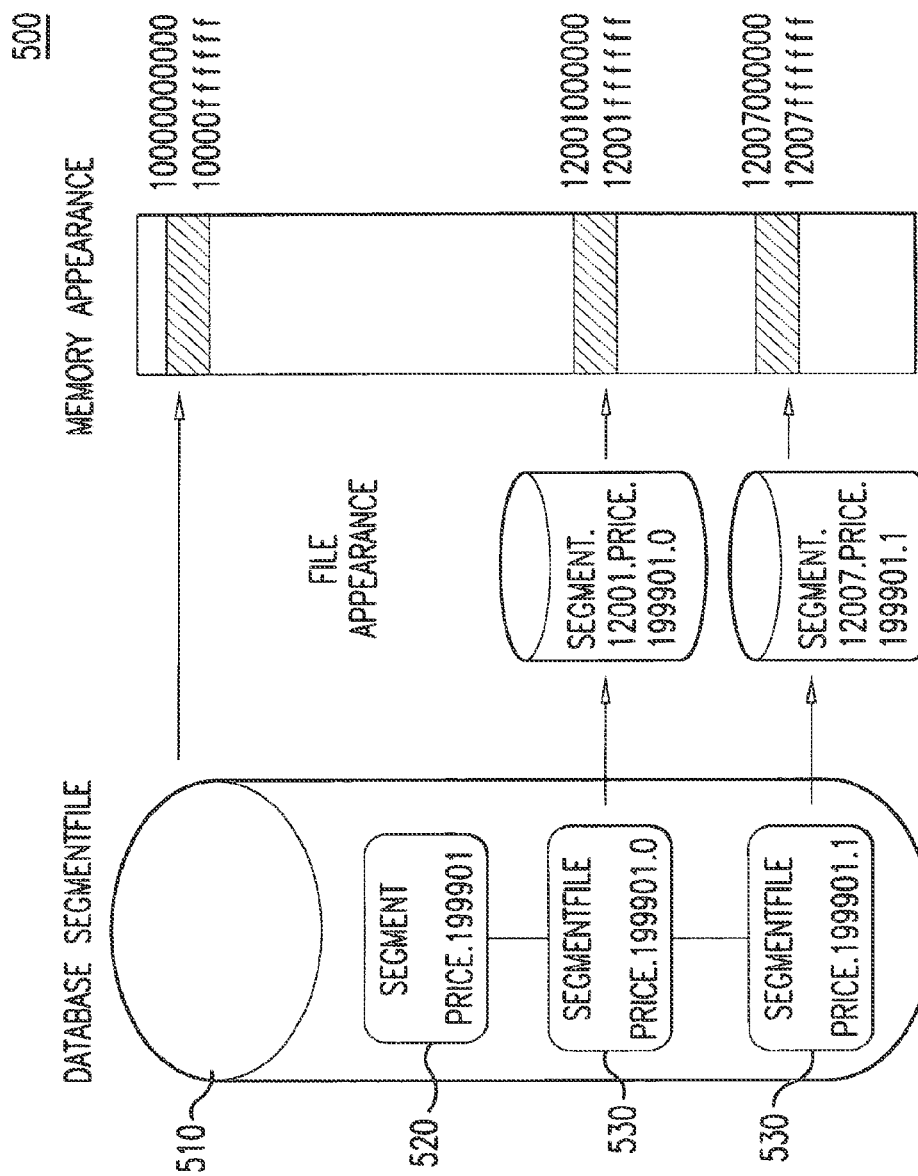
FIG. 5 depicts an exemplary memory-mapped segment file for a SAGA database.

FIG. 5 depicts an exemplary memory-mapped segment file for a SAGA database.

In an embodiment, segment files may be named such that they can be quickly located and mapped back into main memory when a corresponding object referenced by an application leads to a segmentation fault. In particular, the names of segment files may relate to the address of the corresponding object that leads to the segmentation fault.

In an embodiment, the organization of data into memory-mapped segment files may be influenced by a consideration of a logical view of the data, such as interrelationships among data. For instance, related data may be clustered together. Accordingly, the amount of data that needs to be mapped into main memory at anyone moment may be greatly reduced. In addition, the application program may run faster because cache hit rates may be improved and TLB (translation lookaside buffer) misses minimized. Further, segment files may be dropped to purge data from the data repository when necessary or desired.

Since segment files are used to store data, there may be potentially a large number of files stored in segment directories. In an implementation, these files may be protected and stored on a device that provides adequate data velocity and capacity. The embodiments herein may reduce the amount of swap disk space required to run an application program. This reduction may occur since a multiprocessing operating system must reserve disk swap space equal to the size of the programs kept in process memory. It must reserve this space so that it can move the task out of main memory and onto its swap disk if a higher priority program needs to run. The embodiments may herein reduce the amount of swap space that is required, as most of the data may not be mapped into memory at any given moment, and that which is mapped into memory may be mirrored by the disk files themselves. This means that the operating system may not need to reserve swap disk space for this data, whether it is mapped into memory or not.

In a particular embodiment, a segment, such as a segment for a portfolio, may be stored in a Segment Library, which may have a two-level directory structure. Two ASCII formatted, hexadecimal digit sequences, representing a portion of the segment's memory address, may create file and directory names. The file name may also contain the unique ID of the portfolio for human accessibility. For example, if a report starts processing the PortfolioEvents for Portfolio Fred, whose ID is 1000, and Fred's events have not previously been used, a memory fault might occur at (hexadecimal) address 0x11234567890. The fault handler for the data repository may then attempt to open the segment directory segment.4635.112, looking for a filename matching the pattern segment.11234.portfolio.1000.*. The file segment.11234.portfolio.1000.0 will match this pattern, and the fault handler may then map this file at address 0x11234000000 for 16-megabytes. If present, this file may be attached and the process is restarted.

If a very large Portfolio requires more than one segment, its subsequent segments may have ascending final digits; for example, Fred's portfolio might have files segment.11234.portfolio.1000.0, segment.112f5.portfolio.1000.1, and segment.1134a.portfolio.1000.2. (Segment addresses may start, for example, at virtual address 0x10000000000, which is 1 terabyte.) It is to be noted that no central lookup table may be necessary because the address provides all information that is needed.

The above naming convention may enable support of multiple data repositories stored in the same directory, as well as access to 15 terabytes out of the 16-terabyte virtual address space. Further, an administrator may easily locate the files belonging to a particular data repository or portion thereof.

In an example implementation, segmentation also may be employed to store prices. Each PriceMonth, in a main database, may point to its child PriceDays, which may be stored in their matching segments. When a segmentation violation occurs, the segment may be loaded into memory, and processing may be resumed. Such operations may be transparent from the perspective of the application program.

Price segments may have names of the form segment.10008.price.200111.0, where 10008 indicates that this page maps at address 0x10008000000, price shows that this is a price segment, 200111 indicates that this is a price segment for November, 2001, and 0 indicates that this is the first segment in what might be a chain of segments for this month.

It is to be appreciated that analogous naming conventions and organizational techniques to those above may be employed in contexts other than portfolio management applications.

FIG. 5 shows example linkages of the stored database objects and the segment files that hold the data that is memory-mapped when referenced. Three segment files are shown. The first is the Database segment file 510, which contains the segment 520 and segment file 530 objects. The segment file 530 objects are normal object segment files. In the example of FIG. 5, they both contain investment price objects for January 1999. The segment file names may be automatically generated from the keys of the objects being stored and the memory ranges that the data repository routines allocate for them. A segment file may start at 1 megabyte in size and may be extended to a maximum of 16 megabytes. If more space is needed, a new segment file may be created. In various embodiments, a segment may own many non-contiguous segment files.

Figure 6:
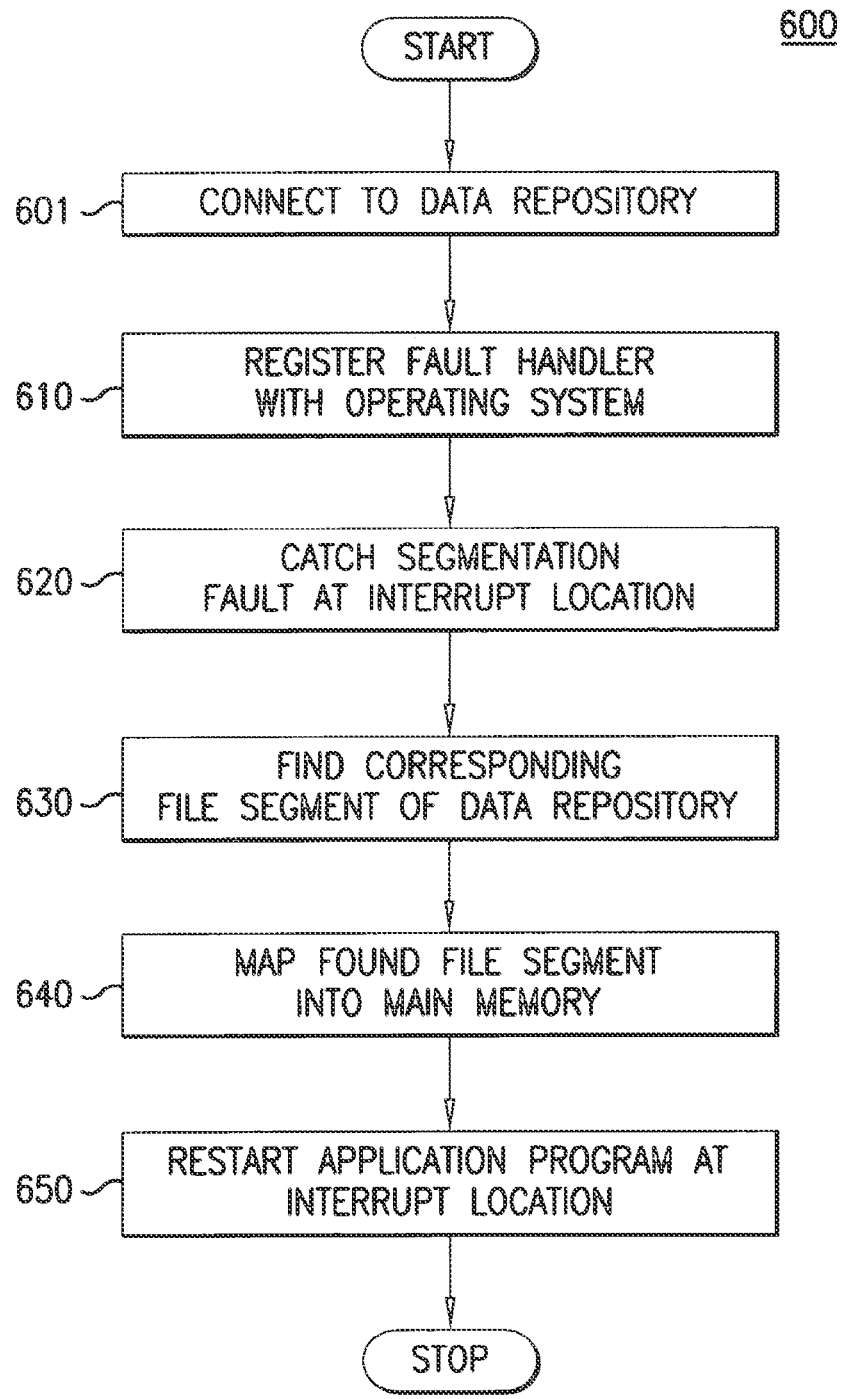
FIG. 6 depicts an exemplary procedure for memory mapping a SAGA database.

FIG. 6 depicts an exemplary procedure for memory mapping a SAGA database. The process 600 may be used for memory mapping of databases consistent with the schema 100 of FIG. 1, as well as with other embodiments herein, such as shown in FIGS. 2-5.

In task 601, an application program may connect to a data repository of a database. The data repository may include a plurality of memory-mapped file segments stored on at least one nonvolatile memory medium.

In task 610, a fault handler for the data repository may be registered with the operating system on which the application program runs. In task 620, the fault handler may catch a segmentation fault issued for a data repository object that is referenced by the application program but not currently mapped into main memory. The segmentation fault may be issued at an interrupt location in the application program.

In task 630, a file segment of the data repository corresponding to the referenced object may be found. In task 640, the found file segment may be mapped into main memory. In task 650, the application program may be restarted at the interrupt location at which the segmentation fault was issued.

Figure 7A:
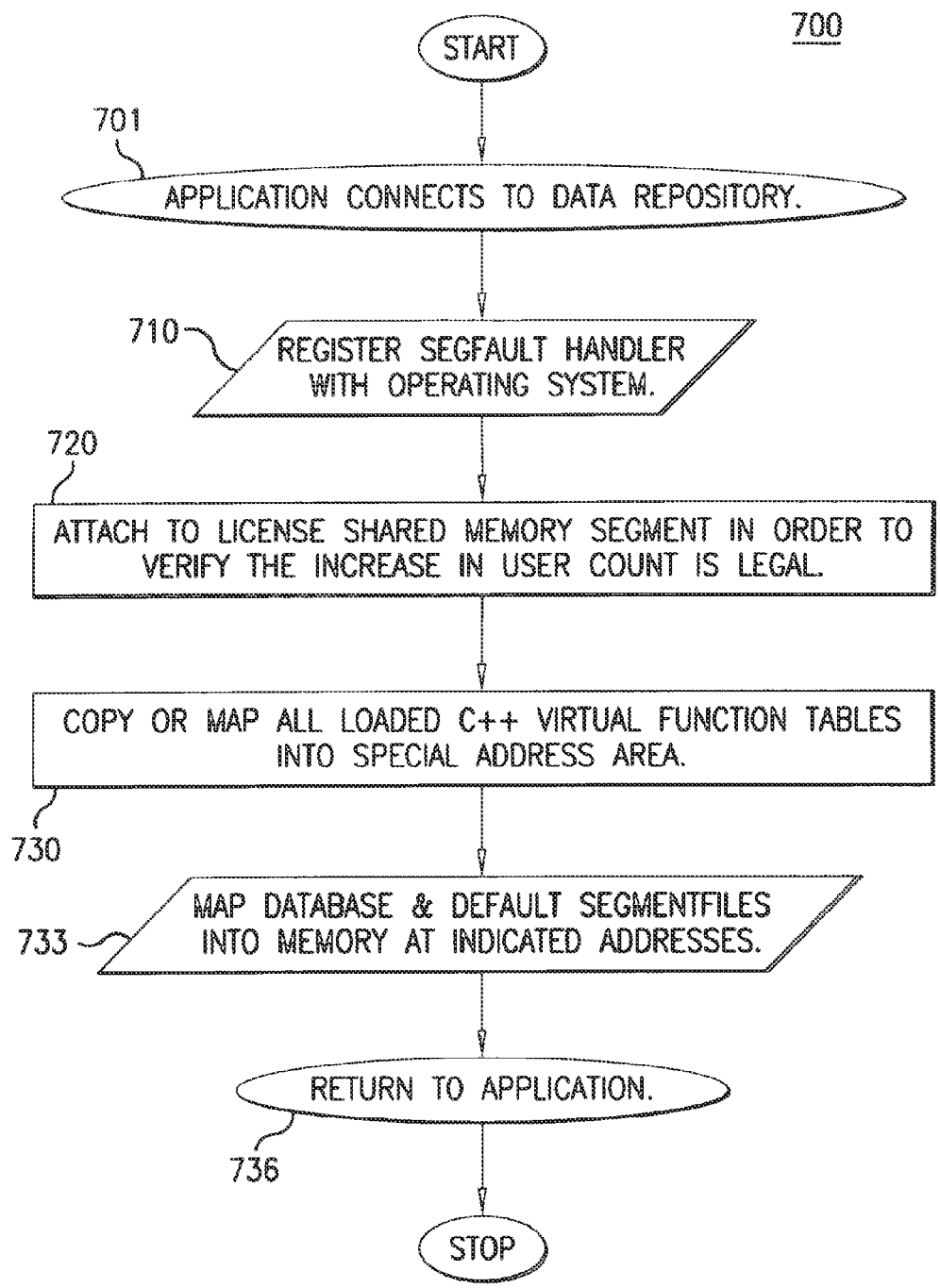
FIG. 7A depicts an exemplary procedure for memory mapping a SAGA database and interacting with outside routines.
Figure 7B:
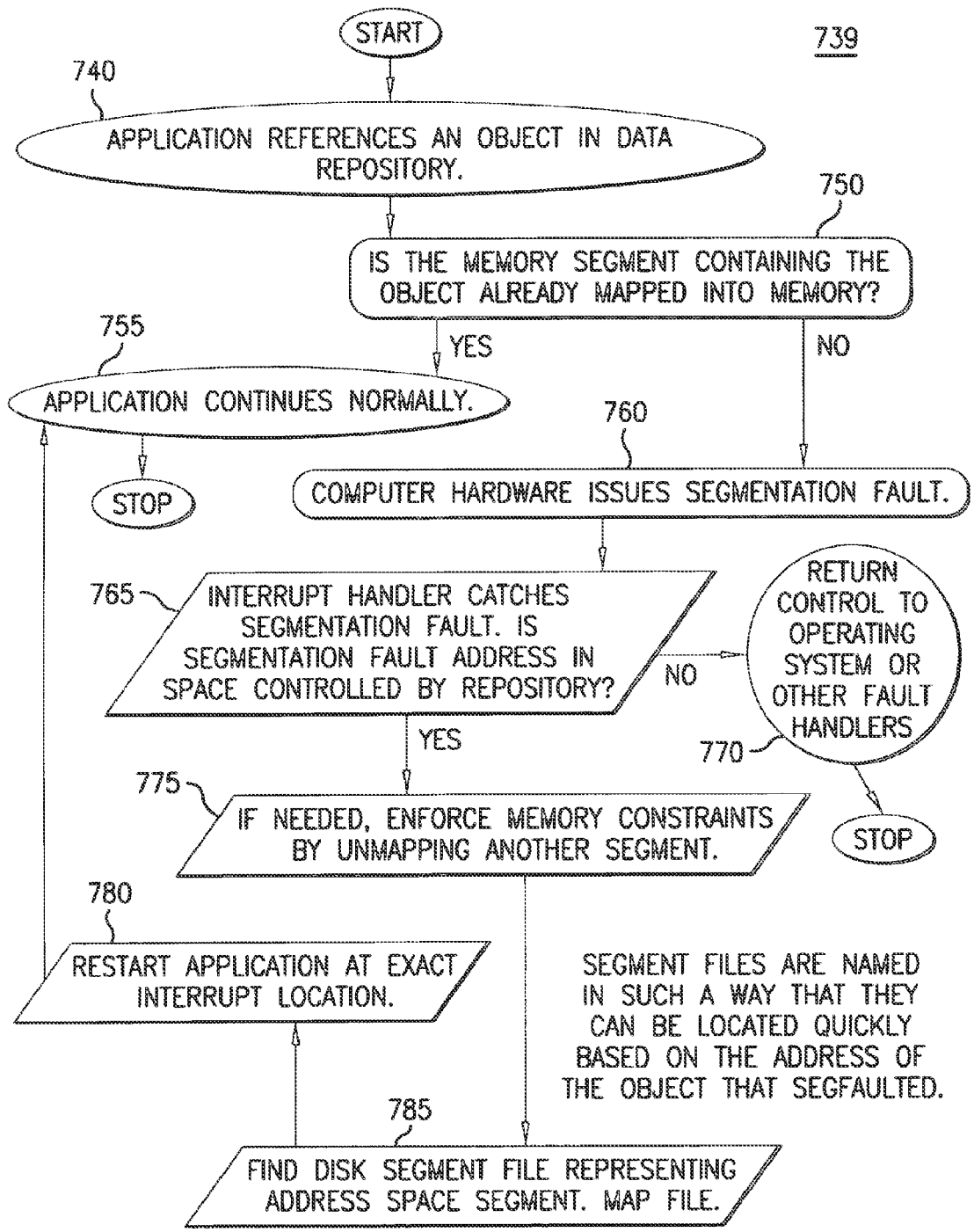
FIG. 7B depicts an exemplary procedure for the operation of a SAGA database.

FIG. 7A depicts an exemplary procedure for memory mapping a SAGA database and interacting with outside routines. FIG. 7B depicts an exemplary procedure for the operation of a SAGA database. The processes 700, 739 are similar to the process 600 in some respects. The ellipses in the processes 700, 739 show interfaces to outside routines, such as application program(s). Rounded rectangles show computer hardware actions.

In task 701 of FIG. 7A, an application may connect to the data repository. In task 710, the repository interrupt handler (SEGFAULT) may be registered with the operating system. This interrupt handler may be able to catch segmentation faults issued by computer hardware during the course of execution of an application.

In task 720, the application may attach to a license shared memory segment. This task may be used to verify that the increase in user count is legal. Task 720 need not be performed in certain embodiments.

In task 730, all loaded C++ virtual functions may be copied or mapped into a special address area.

In task 733, database and default segment files may be mapped into memory at the addresses indicated by their names. For example, the database segment file that is named segment.10000.database.1.0 may be mapped into memory starting at location 0x10000000000. Similarly, the first default segment, segment.10001.default.1.0, may be mapped starting at location 0x10001000000. This mapping may be done using the same address mapping methodology depicted in FIG. 5.

In task 736, control may be returned to the application.

Turning to task 740 of FIG. 7B, the application may reference an object in the data repository. The memory segment for that object may or may not be already mapped into main memory. Task 750 may determine which is the case. If the segment is already mapped into main memory, then in task 755, the application may continue normally.

If the segment is not already mapped, then the computer hardware may issue a segmentation fault (task 760).

In task 765, the interrupt handler may catch the segmentation fault. It may be determined whether the segmentation fault address is in the space controlled by the data repository. If not, then control may be returned to the operating system or other fault handlers (task 770).

If the fault address is in that space, then, if needed, memory constraints may be enforced by unmapping another segment (task 775). The disk segment file that represents the address space segment may be found, and the file may be mapped to main memory (task 785). As mentioned above, segment files may be named in such a way that they can be located quickly based on the address of an object that led to a segmentation fault.

In task 780, the application may be restarted at the exact interrupt location associated with the segmentation fault.

Figure 8:
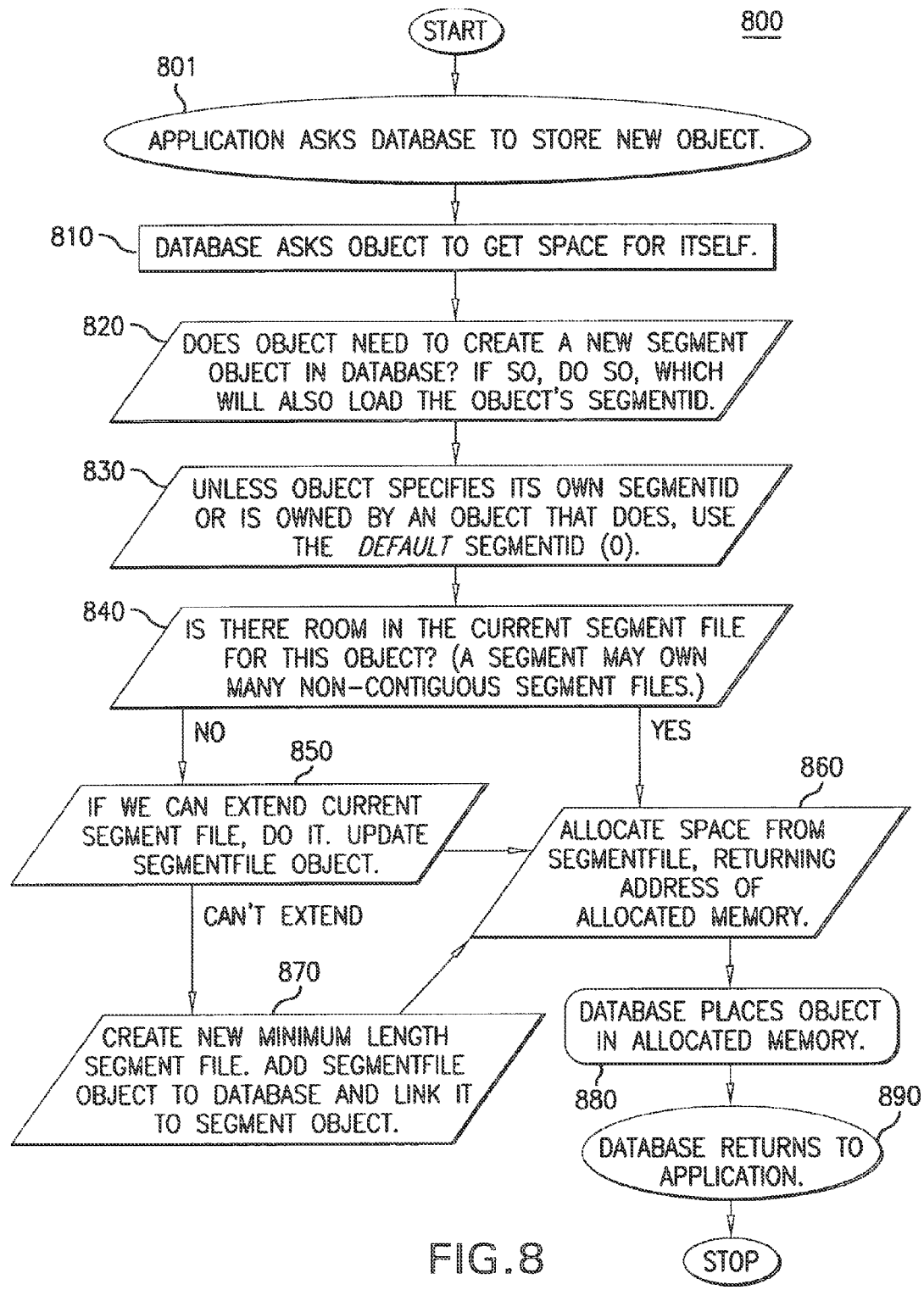
FIG. 8 depicts an exemplary procedure for storing a new object in a SAGA database.

FIG. 8 depicts an exemplary procedure for storing a new object in a SAGA database. The process 800 may be applied when new objects need to be stored in the data repository.

In task 801, an application desiring to add an object to the database calls either an insert or update subroutine as defined by the database API (Application Program Interface). By calling this appropriate subroutine, control may be passed to the database routines (task 810), which attempt to perform the corresponding operation and return their success or failure back to the application (task 890).

In task 820, if the object needs to create a new segment object in the database, the segment object may be created, which also loads the object's segmentID. A new segment object, with its new corresponding segmentID, may be required if the object being stored is the first instance of a new species member. For example, in an embodiment, suppose a new Portfolio, Jean, is added to the database. When the first trade for Portfolio Jean, a Buy for example, must be inserted, there may be no place to put this Buy until a segment file is created with a corresponding name and a new segment object to point to it. If the segment object already exists, it will have been retrieved as part of the test performed in task 820 and, as such, the stored object's appropriate segmentID will be known.

Unless the object specifies its own segmentID or is owned by an object that does, the default segmentID(0) may be used (task 830). In task 840, the process may determine whether there is space for this object in the current segment file. If so, then space may be allocated from the segment file, and the address of allocated memory may be returned (task 860). If not, the current segment file may be extended if possible, and the segment file object may be updated (task 850). Otherwise, a new minimum length segment file may be created, the segment file object may be added to the database, and the segment file object may be linked to the segment object (task 870).

In task 880, the database may place the object in the allocated memory. The database may return to the application in task 890

As described above, a SAGA database may contain various persistent objects. Once an object is entered into the SAGA database, it may never be removed. If an object is updated, instead of being removed, a new variant of the object may be created and the original object may have a knowledge end time set to the moment of the creation of the new variant. The objects in the SAGA database may represent the holdings in various investment portfolios, however, the SAGA database may not include objects that aggregate, or otherwise represent the holdings of individual portfolios or groups of portfolios. The SAGA database may include no consolidated views of the data in the SAGA database.

For example, an individual with a portfolio may wish to know how much the portfolio is worth at a given time, how many shares of various equities are held in the portfolio, what percentage of the total value of the portfolio different equities represent, and so on. The various aggregates and statistical representations may be calculated based on the objects in the SAGA database, but may not be stored in the SAGA database. Some portfolios may include millions of objects, which may make calculating various aggregate and consolidated views a processor-intensive, time-consuming task.

Once the aggregates and statistical representations are calculated for a portfolio in the SAGA database the first time, the data produced may be stored. Because the data for the aggregates and statistical representations may not represent real world persistent data, but rather a numerical derivative of that data, the data may not be stored with the persistent objects in the SAGA database. The data may be stored in a quasi-persistent Bookkeeping Information Space (BIS).

Figure 9:
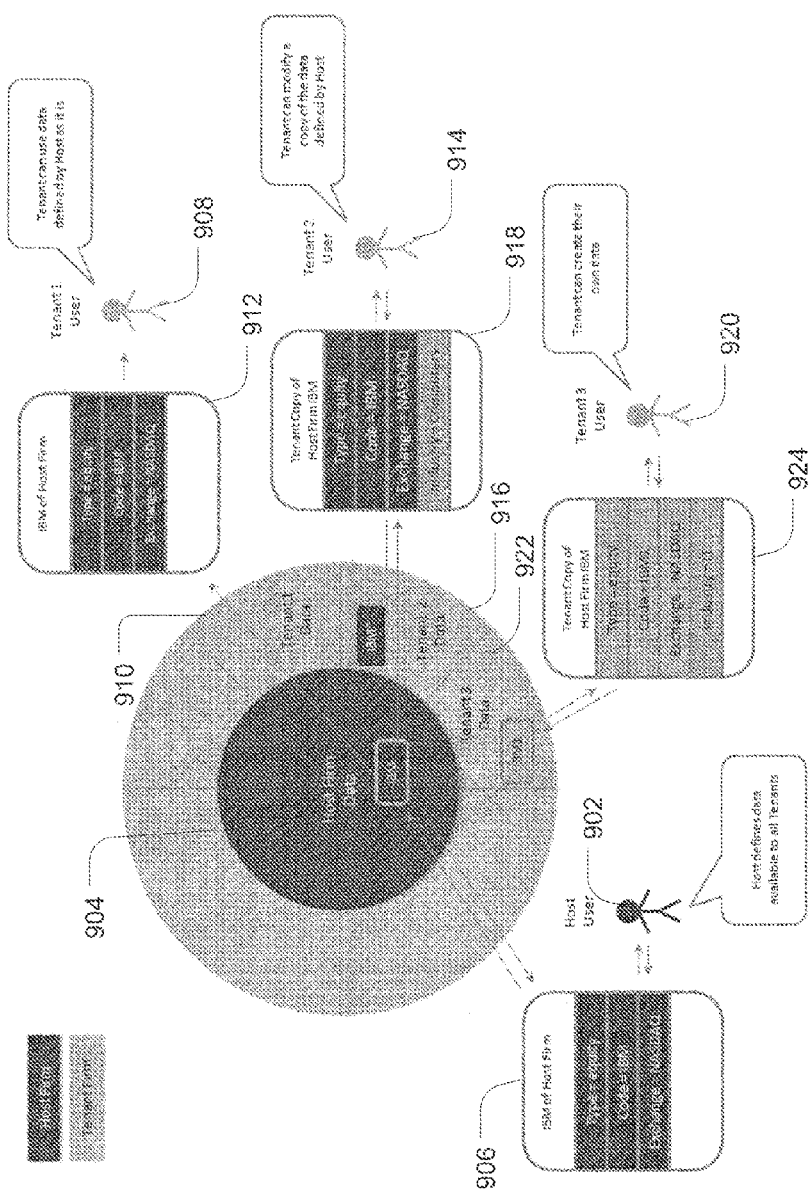
FIG. 9 depicts an exemplary representation of a MUTED system.

FIG. 9 shows one embodiment of a host-tenant MUTED system. A host user 902 maintains a host firm database 904. The host user 902 may define one or more data objects 906 to populate the host firm database 904. A first tenant user 908 may access the host firm database 904 and may use the host firm data objects 906 in the host firm database 904 as defined by the host user 902. A first Firm 910 may be generated for the first tenant user 908. A Firm may comprise a subset of a host SAGA database unique to the tenant user. The first tenant user 908 may have only read-access to the data objects 912 of the first Firm 910. A second Firm 916 may be generated for a second tenant user 914. The second tenant user 914 may modify the host data objects 906 defined by the host user 902. Tenant versions of each of the modified data objects 918 may be maintained for the second tenant 914 within the second Firm 916. The tenant copies of the modified data objects 918 are only accessible by the second user 914 and are not visible to either the host 902 or the other tenant users 908, 920. A third Firm 922 may be maintained for a third tenant user 920. The third tenant user 920 may add additional data to the third Firm 922 beyond the host-provided objects 906. The tenant-defined objects 924 may be visible only to the third tenant user 920, and are not accessible by either the host user 902 or the other tenant users 908, 914.

In some embodiments, a MUTED system may satisfy four requirements for accessing or changing data: 1) a tenant may be able to see any data provided by the host; 2) the tenant may be able to add data to the KnowledgeBase that is only viewable by the tenant; 3) the tenant data may be found prior to host data if a tenant's flexible queries could match data from both environments; and 4) the tenant may be able to override members of the data provided by the host in a way that is only visible to the tenant overriding the host data.

In a SAGA database, when the database is asked to retrieve information for a SAGA object whose address is already known, or from objects directly linked to a known object, the information is instantly available from memory. If a user asks the database to retrieve information not directly linked by another SAGA object, the database may perform a generalized search. For example, in Geneva, if the user asks the Graphical User Interface (GUI) to retrieve a particular portfolio definition, the SAGA does not have an identified object from which to start searching. The SAGA will instead look for a portfolio yNode starting from the KnowledgeBase pointer.

In an embodiment, the KnowledgeBase pointer may contain the same address as that stored in the shmDatabase's shmLink pointer, for example, the first object in the database. When an IBIS temporary database is linked to the main database, KnowledgeBase is changed to point to the first yNode of the IBIS database and the last yNode of the IBIS is changed to point to the value of shmLink. Patching two locations in memory, by changing the KnowledgeBase pointer and the last yNode of the IBIS, links a temporary database, the IBIS, in front of the persistent SAGA, without any changes to the SAGA itself.

Figure 10:
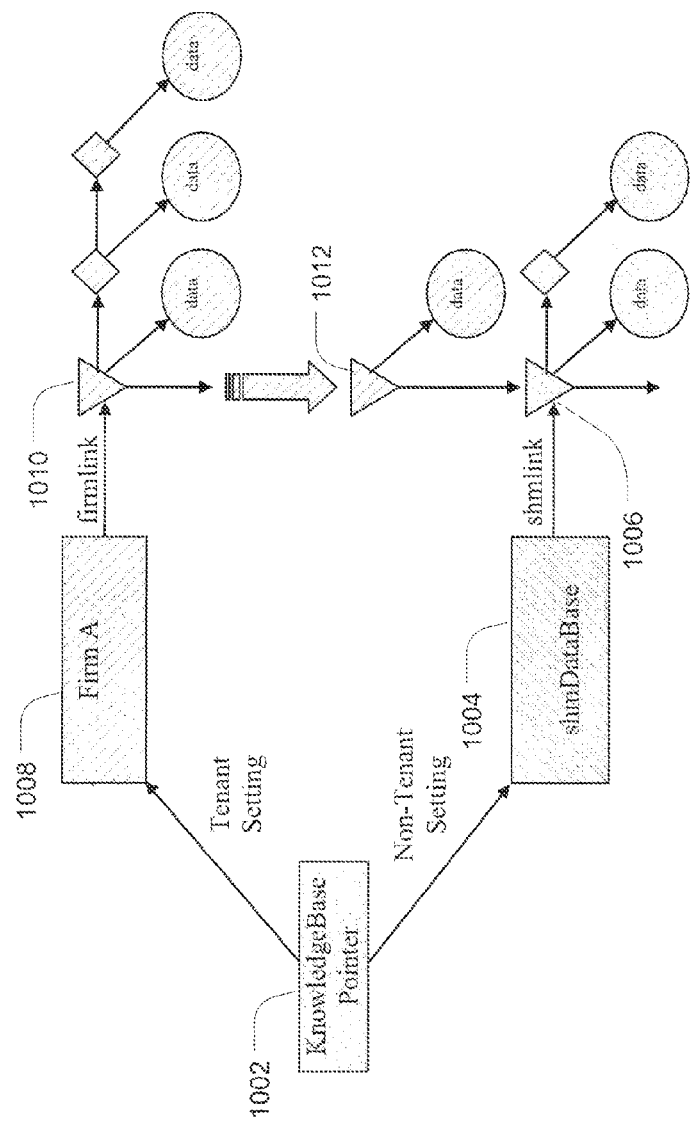
FIG. 10 depicts an exemplary procedure for linkage of tenant and host sub-databases.

A database administrator may create a subset of the SAGA, referred to as a Firm, which is pointed to by an agaFirm object stored in the SAGA. FIG. 10 illustrates a tenant-use case and a non-tenant use case for the SAGA. In the non-tenant use case, the KnowledgeBase pointer 1002 points to the shmDatabase 1004, specifically to the first yNode 1006 of the shmDatabase. In the tenant use case, the KnowledgeBase pointer 1002 is changed to the value of the agaFirm object to point to a Firm object 1008 created for the tenant, specifically the first yNode 1010 of the Firm object 1008. The last node 1012 of the Firm object 1008 is configured to point to the first yNode 1006 of the shmDatabase.

Each agaFirm object may comprise a unique numerical identification assigned by the SAGA, a unique name assigned by the tenant, and a general description. An agaFirm object may comprise a link, for example a firmLink, which points to the data objects that are unique to the tenant's Firm. The firmLink is similar to the shmLink of the shmDatabase, which is the link to all of the host's data objects. When a tenant, for example, a first tenant A, accesses the SAGA, the KnowledgeBase pointer (or firmLink) is loaded with the address of a Firm generated for the tenant user, Firm A. The firmLink in turn points to objects of Firm A, which are associated with tenant A.

The last yNode in the chain of tenant objects, for example, the objects pointed by firmLink, points to the first yNode in shmLink. By linking the Firm to the main database, a query that begins at the firmLink may continue to the shmLink if the object is not found in the Firm segment. By linking the Firm and the main database in this way, tenant queries first search through the tenant objects and then the host objects. If the tenant defines objects that are of similar types to those in the host database, the tenant version of those objects will be encountered first during any generalized search that might be necessary.

In one embodiment, tenant sub-databases may be persistent in the SAGA and the agaFirm objects may be stored in the main database. When a tenant user attaches to the SAGA, the KnowledgeBase pointer in the user memory space may be changed to point to the tenant's agaFirm object. By maintaining agaFirm objects and altering the KnowledgeBase pointer in the user memory space, no changes are necessary to the main database itself. No links are generated between one tenant's data and another tenant's data or from a host database object to a tenant data object, and therefore the privacy of each tenant's data is maintained, as only the tenant associated with the agaFirm object can access the tenant data objects.

In one embodiment, agaFirm objects may reside in one of the SAGA's default segments to ensure that the agaFirm objects are always maintained in memory by the operating system. Tenant data may be stored in a segment devoted to the tenant.

In one embodiment, a tenant may be able to override host data objects. The overwriting of the host data objects may be visible only to the tenant creating the overwritten objects. The host data objects may continue to be visible to the tenant Firm, such that if the host updates a non-overwritten host data object, the tenant is able to see the changes to those objects.

When a tenant overrides a member of the host-provided reference data, e.g., a host-provided data object, the SAGA creates a Firm version of the data object using an agaFirmCore object. An agaFirmCore object stores only the members of the host data object that have been changed by the tenant. The agaFirmCore objects are accessible to the tenant through the host Firm table (see FIG. 14).

Each agaFirmObject may be derived from the agaDBCore class, the same class from which SAGA objects derive their properties. Because the agaFirmObjects are derived from the agaDBCore class, the agaFirmCore objects may have time variants. A tenant may modify the appearance of some host object member values, and then, at a later time, change those host object member values or modify the appearance of some other host object members. The time variants of the agaFirmCore objects allow the SAGA to reproduce the Firm at an earlier knowledge time, including changes made by the tenant to host provided data objects. In some embodiments, the tenant may be able to restore a host data object to the original host definition of the object and eliminate all tenant overrides.

In one embodiment, the agaDBCore-derived objects, such as the agaFirmCore objects, may provide a tenant with the ability to recreate user-defined-data (UDD) members. When a tenant overrides any host object's UDD, all of the object's UDDs are overridden, as UDDs are treated as a single object member with multiple chained instances.

In one embodiment, a tenant Firm database segment may use an agaYFirmNode and an agaXFirmNode to uniquely link objects, similar to the way the host segments use agaYDBNode and agaXDBNode nodes. The node types agaYDBNode and agaXDBNode may derive directly from the agaYFirmNode and agaXFirmNode objects and may be added to a pointer of the Firm Table of the host object that is being overridden by the tenant. In some embodiments, if a host object is not being overridden, such as if the tenant is adding new data to the tenant Firm, the pointer may comprise a NULL value.

Figure 11:
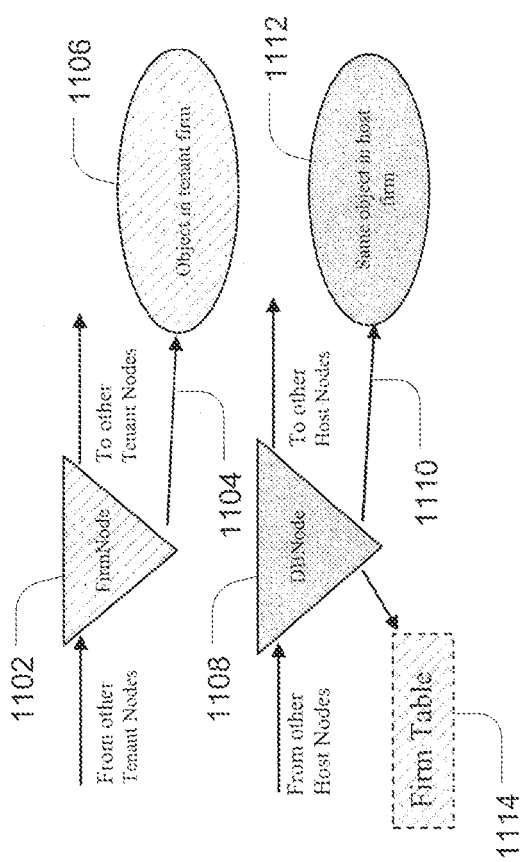
FIG. 11 depicts an exemplary procedure for tenant/host backbone link node interconnections.

FIG. 11 depicts an exemplary procedure for tenant/host backbone link node interconnections. A FirmNode 1102 may be linked to one or more additional Firm nodes. The FirmNode 1102 provides a link 1104 to a tenant created object 1106 in the tenant Firm. A DBNode 1108 may be linked to one or more additional DBNodes. The DBNode 1108 may provide a link 1110 to an object 1112 in the host data set. The DBNode 1108 may include a pointer to a Firm Table 1114 containing pointers to agaFirmCore object 1204 in FIG. 12 that is a tenant-version of the host data object. Tenant objects and tenant nodes, such as, for example, FirmNode 1102, may point to both tenant objects and/or host objects.

Figure 12:
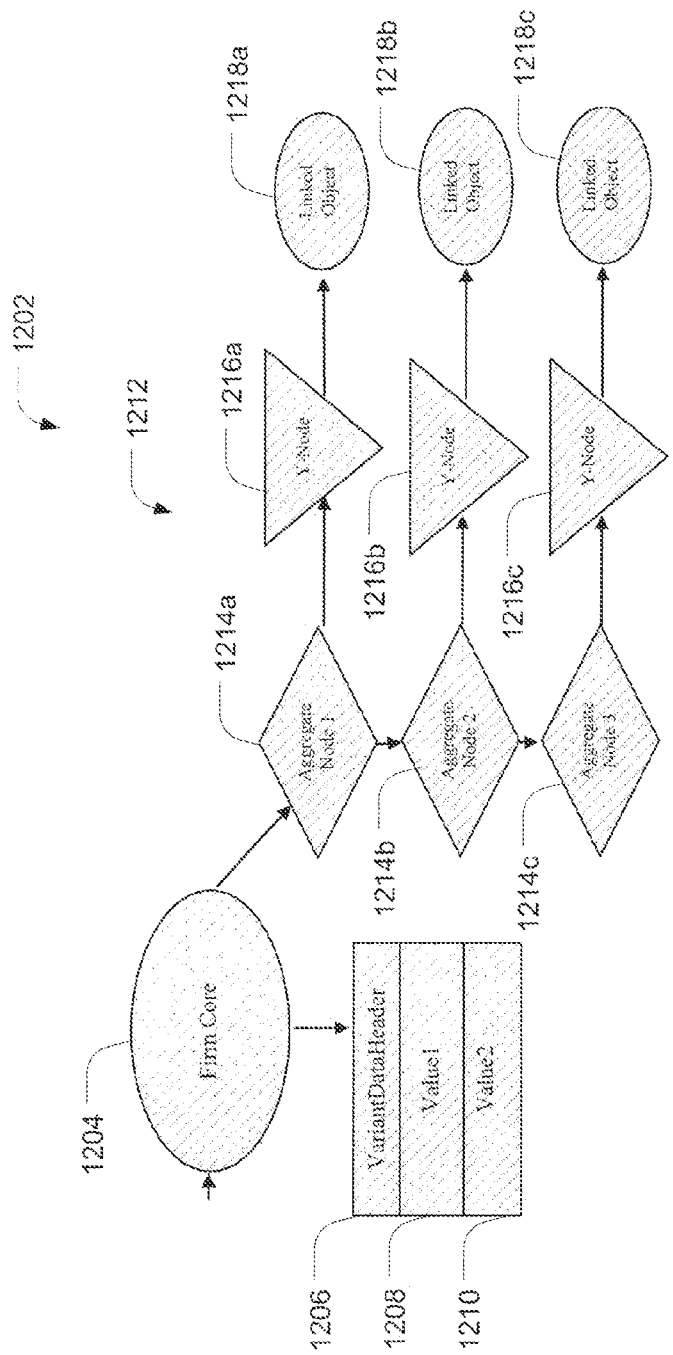
FIG. 12 depicts an exemplary representation of an internal structure of an agaFirmCore object.

FIG. 12 depicts an exemplary embodiment of an agaFirmCore object 1202. When a tenant-version of a host-provided data object is created, an agaFirmCore object 1202 is generated to manage the tenant-version of the data object. A firmCore 1204 maintains one or more overriding values for the Firm data object. The firmCore 1204 may maintain overriding values in two groups—simple numbers 1208, 1210 (such as, for example, integers, floating point numbers, and strings) and link members 1212. The simple numbers 1208, 1210 may be prefixed by a VariantDataHeader 1206 to describe which simple numbers of the host-provided data object are being overridden. The link members may be maintained using an agaAggregateNode chain. An agaAggregateNode chain may comprise an aggregateNode 1214a-1214c, a yNode 1216a-1216c, and a linked object 1218a-1218c linked by the yNode 1216a-1216c.

An Aggregate Node, such as, for example, the AggregateNode 1214a, may store the ID of the link member that the agaFirmCore object 1202 is overriding in the host object. For example, in one embodiment, if a firm user customizes an "investment type" link member of an "IBM" investment host object, the SAGA may generate an agaFirmCore object with an Aggregate Node with an ID of, for example, agaInvestment::aga_Investment Type. The Aggregate Node may point to a yNode that links to the investment type object that overrides the "investment type" of the "IBM" investment host object. If multiple link members are customized, the firmCore may point to a chain of Aggregates Nodes 1214a-1214c, one for each overriding link member 1218a-1218c.

In some embodiments, it may be important to know whether an object accessed by a user, such as a host or a tenant, has applicable overrides. A host object may link all of the Firm versions (agaFirmCore instances) to the unique node of the host object through either an agaYDBNode::agaFirmTable or an agaXDBNode::agaFirmTable depending on the type of the unique node (see FIG. 14). In one embodiment, the Firm Table may comprise a class name, such as, for example, genNodeHashTable. Tenant versions of host-provided objects are stored in the Firm Table indexed by a Firm ID.

Figure 13:
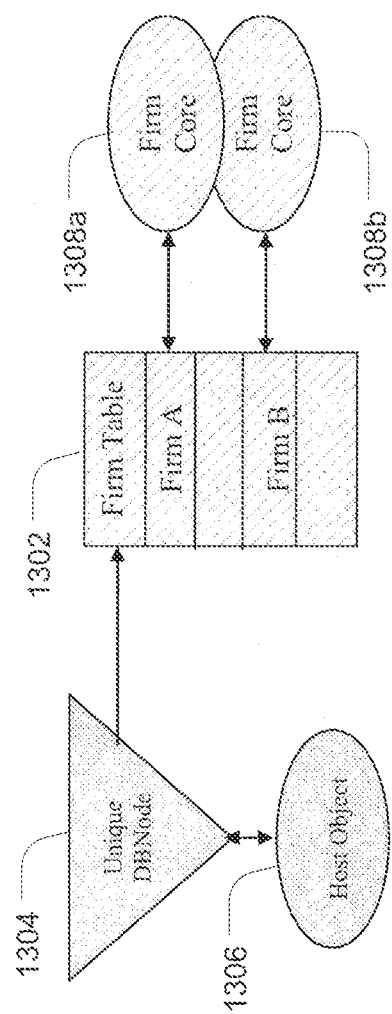
FIG. 13 depicts an exemplary procedure for linkage of tenant created Firm variant objects.

FIG. 13 depicts an exemplary procedure for linkage of tenant-variant objects. If a Firm Table 1302 is needed, for example, because a tenant modifies a host-provided object, a Firm Table 1302 may be generated by the SAGA. The Firm Table 1302 may be generated at a first size, such as, for example, four entries. A link to the Firm Table 1302 may be added to the Unique DBNode 1304 corresponding to the host-provided data object being overridden by the tenant. The DBNode 1304 maintains a link to the original host object 1306. The Firm Table 1302 may provide links to one or more tenant-modified objects unique to each Firm. The Firm Table 1302 provides a link to the firmCore 1308a-1308b for each unique tenant-modified object.

In one embodiment, the Firm Table 1302 may be indexed using a tenant ID modulo the Firm Table Size. If a collision of indices occurs, one or more overflow chains may be created. In one embodiment, when a Firm Table 1302 becomes three-quarters full, the Firm Table 1302 may be doubled in size.

In one embodiment, if a tenant user performs a generalized search for a host object, for example using an agaGet( ) command, the SAGA may provide the values stored in the tenant-modified object corresponding to the host object the user searched for. For example, the host object may indicate that a tenant-modified version of the data object exists, in which case, an operator, such as the C++ operator=( ), may overwrite the local instance with the values for the data object stored in the Firm variant of the data object. In one embodiment, when a tenant user directly accesses a host object that has a tenant-version, the tenant user's accessor function, such as a get command, checks for a matching agaFirmCore object and, if appropriate, returns the tenant's customized value instead of the value stored in the host object. Example code for a getInvestmentType( ) accessor, as shown below, may be generated automatically by a schema builder.

```
agaLink agaInvestment::getInvestmentType( ) const
{
    ....
    if(shmDataBase->shmNextFirmID > 1 &&
       this == agaShmAddress)
    {
        agaFirmCore *pFirmCore = GetFirmCore( );
        agaLink temp = NULL;
        if (pFirmCore &&
           pFirmCore->GetMember
           (MEM_ID_AGAINVESTMNT_INVESTMNTTYPE, temp))
               return temp;
    }
    return aga_InvestmentType;
```

In one embodiment, the Firm Table 1302 may comprise the only data type in the SAGA that can change size. The Firm Table 1302 may increase in size, for example, when additional Firm versions are created for the same host-provided data object. The Firm Table 1302 may double in size when the Firm Table 1302 is three-quarters full. The SAGA memory previously allocated for the Firm Table 1302 may be converted into an agaFreeCore object and recycled for future use.

In one embodiment, creating a tenant version of a host-provided object may increment a host object reference counter by one to prevent the host object from being deleted while a tenant object is referencing the host object.

Figure 14:
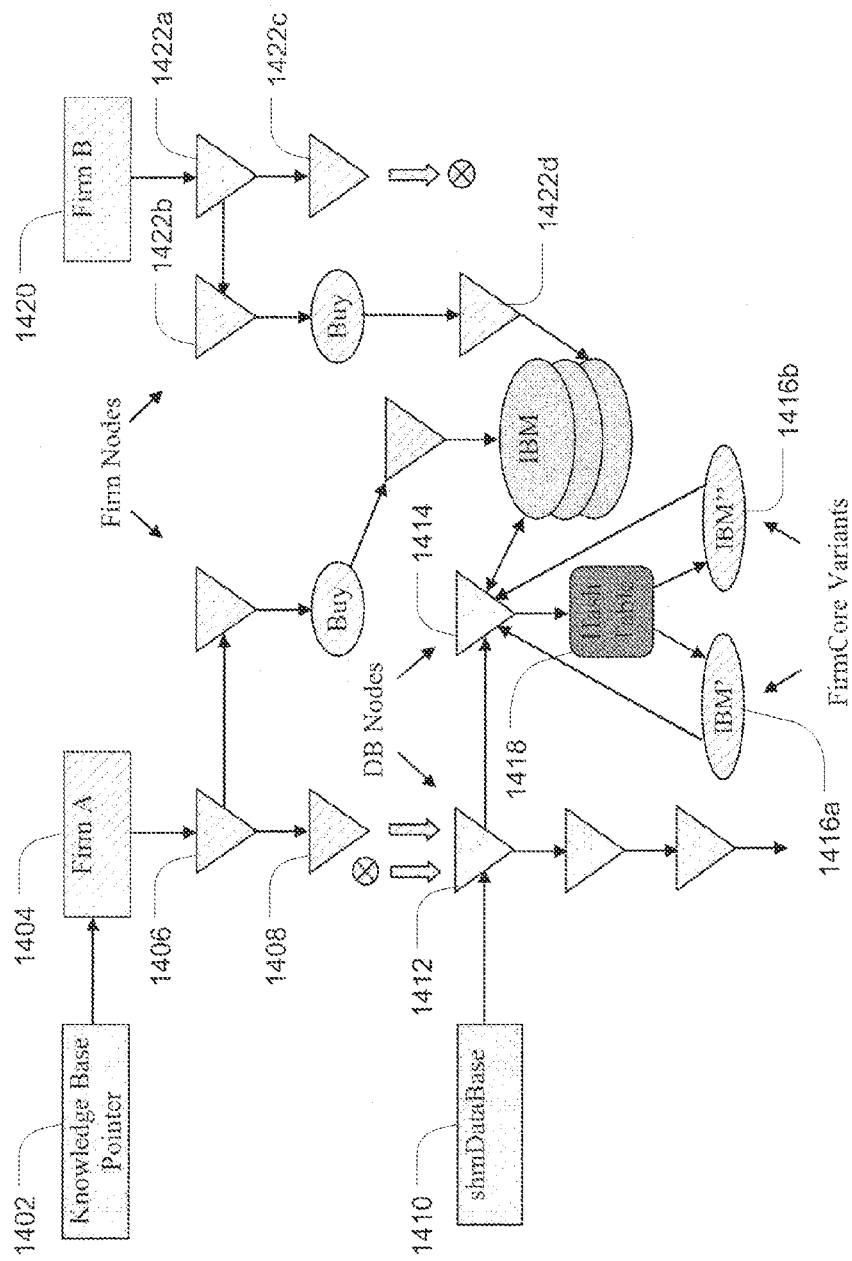
FIG. 14 depicts an exemplary representation of an overall linkage of host and tenant objects in a MUTED system.

FIG. 14 depicts an exemplary representation of an overall linkage of host and tenant objects in a MUTED system. In one embodiment, when a first tenant connects to the host database, the KnowledgeBase pointer 1402 for the first tenant is changed to point to the agaFirm object 1404 corresponding to the first tenant's Firm. The agaFirm object 1404 comprises a pointer to the first yNode 1406 of the Firm. The last yNode 1408 of the Firm comprises a link to the first yNode 1412 of the shmDataBase 1410. In one embodiment, the shmDataBase 1410 may comprise one or more variants 1416*a*, 1416*b* of host-provided objects. A DBNode 1414 for the host object may comprise a pointer to a Firm Table 1418 indicating the location of each firm variant 1416*a*, 1416*b* of the host object identified by Firm ID.

A second agaFirm object 1420 linked to a second tenant may exist simultaneously on the SAGA with the first agaFirm object 1404. The tenant modified objects 1422*a*-1422*d* of the second tenant are isolated from the first tenant and the tenant modified objects 1406, 1408 of the first tenant are isolated from the second tenant. The tenant data for each tenant is not visible to the host or to other tenants, and therefore data privacy is maintained.

In some embodiments, the SAGA may comprise prohibitions on creation or modification of certain objects by hosts and/or tenants. For example, in one embodiment, a Geneva application implementing MUTED may prohibit tenants from overriding the host's definitions of one or more objects, such as, for example, User, Firm, Portfolio, Event, Lockdown, TWR Set, User Defined Field, Access Control, and User Role objects. The Geneva application may further prevent tenants from defining one or more new objects, such as, for example, User, Firm, host-defined User Defined Field, Investment, Access Control, and User Role objects. In one embodiment, the prohibitions may prevent tenants from altering usage controls that are imposed on the tenants, creating subtenants, and/or altering investments in a way that would prevent consistent consolidated reporting across multiple tenants. Although in some embodiments constraints may be implemented, a MUTED system may be operated without constraints.

As used herein, a "computer" or "computer system" may be, for example, and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media.

Computers and computer systems described herein may include operatively associated computer readable memory media such as memory for storing software applications and instructions used in obtaining, processing, storing, and/or communication data. It can be appreciated that such memory can be internal, external, remote, or local with respect to its operatively associated computer or computer system. Memory may also include any means for storing software or other instructions, including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer readable media.

In general, computer readable memory media may include any non-transitory memory medium capable of being a memory for electronic data representative of data or computer instructions stored, communicated, or processed in accordance with embodiments of the present invention. Where applicable, method steps described herein may be embodied or executed as computer instructions stored on a computer readable memory medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials, arrangement of elements, steps, structures, and/or parts may be made within the principle and scope of the invention without departing from the invention as described in the following claims.

What is claimed is:

1. An integrated computer system for providing Multi-Tenant In-Memory Database access to an application program accessing an object-oriented database (OODB), the integrated computer system comprising:
   1) a processor; and
   2) a non-transitory computer readable medium in communication with the processor, wherein the non-transitory computer readable medium is configured to store computer program instructions that when executed by the processor are operable to cause the processor to:
      (a) connect the application program to a data repository for a database;
      (b) generate a first firm for a first tenant, wherein the first firm comprises a sub-set of the database;
      (c) place an address of a first object of the first firm into a knowledge base pointer associated with the first tenant;
      (d) place an address of a main database object of the database into a pointer in an object of the first firm;
      (e) access the first firm through the knowledge base pointer and the database through the pointer object of the first firm;
      (f) generate a second firm for a second tenant, wherein the second firm comprises a sub-set of the database;
      (g) place an address of a first object of the second firm into a knowledge base pointer associated with the second tenant;
      (h) place an address of the main database object of the database into a pointer in an object of the second firm;
      (i) add one or more tenant objects to the first firm;
      (j) link one or more node objects of the first firm to the one or more tenant objects;
      (k) search the first firm and the database for a data object, wherein the search is executed by accessing the knowledge base pointer and searching each of the tenant objects prior to searching the database;
      (l) generate a first tenant version of a database object;
      (m) add the tenant version to the first firm;
      (n) create a firm table in the database object, wherein the firm table comprises an address of the first tenant version of the database object;
      (o) generate a second tenant version of the database object;
      (p) add the second tenant version to the second firm; and
      (q) insert an address of the second tenant version into the firm table in the object in the database.

2. A method for providing Multi-Tenant In-Memory Database access to an application program accessing an object-oriented database (OODB), the method comprising:
   (a) connecting, by a processor, the application program to a data repository for a database;
   (b) generating, by the processor, a first firm for a first tenant;
   (c) placing, by the processor, an address of a first object of the first firm into a knowledge base pointer associated with the first tenant;
   (d) placing, by the processor, an address of a main database object of the database into a pointer in an object of the first firm; and
   (e) accessing, by the processor, the first firm through the knowledge base pointer and the database through the pointer object of the first firm;
   (f) generating, by the processor, a second firm for a second tenant;
   (g) placing, by the processor, an address of a first object of the second firm into a knowledge base pointer associated with the second tenant;
   (h) placing, by the processor, the address of a main database object of the database into a pointer in an object of the second firm object;
   (i) adding, by the processor, one or more tenant objects to the first firm; and
   (j) linking, by the processor, one or more node objects of the first firm to the one or more tenant objects.

3. The method of claim 2, further comprising:
   (a) searching, by the processor, the first firm and the database for a data object, wherein the search is executed by accessing the knowledge base pointer and searching each of the tenant objects prior to searching the database.

4. The method of claim 2, further comprising:
   (a) generating, by the processor, a tenant version of an object in the database;
   (b) adding, by the processor, the tenant version to the first firm; and
   (c) creating, by the processor, a firm table in the object in the database, wherein the firm table comprises an address of the tenant version of the object in the database.

5. The method of claim 4, further comprising:
   (a) generating, by the processor, a second tenant version of the object in the database;
   (b) adding, by the processor, the second tenant version to the second firm; and
   (c) inserting, by the processor, an address of the second tenant version into the firm table in the object in the database.

6. The method of claim 5, further comprising doubling, by the processor, a portion of memory allocated to the firm table, wherein the portion of memory is doubled when the firm table is three-quarters full.

7. The method of claim 4, further comprising:
   (a) accessing, by the processor, the object in the database;
   (b) checking, by the processor, for the tenant version of the object in the database;
   (c) returning, by the processor, the tenant version of the object in the first firm.

8. An integrated computer system for providing Multi-Tenant In-Memory Database access to an application program accessing an object-oriented database (OODB), the integrated computer system comprising:
   1) a processor; and
   2) a non-transitory computer readable medium in communication with the processor, wherein the non-transitory computer readable medium is configured to store computer program instructions that when executed by the processor are operable to cause the processor to:
      (a) connect the application program to a data repository for a database;
      (b) generate a first firm for a first tenant;

(c) place an address of a first object of the first firm into a knowledge base pointer associated with the first tenant;

(d) place an address of a main database object of the database into a pointer in an object of the first firm; and (e) access the first firm through the knowledge base pointer and the database through the pointer object of the first firm;

(f) generate a second firm for a second tenant;

(g) place an address of a first object of the second firm into a knowledge base pointer associated with the second tenant;

(h) place the address of a main database object of the database into a pointer in an object of the second firm;

(i) add one or more tenant objects to the first firm; and (j) link one or more node objects of the first firm to the one or more tenant objects.

9. The integrated computer system of claim 8, the processor further operable to:
(a) search the first firm and the database for a data object, wherein the search is executed by accessing the knowledge base pointer and searching each of the tenant objects prior to searching the database.

10. The integrated computer system of claim 8, the processor further operable to:
(a) generate a first tenant version of a database object;
(b) add the first tenant version to the first firm; and
(c) create a firm table in the database object, wherein the firm table comprises an address of the first tenant version of the database object in the database.

11. The integrated computer system of claim 10, the processor further operable to:
(a) generate a second tenant version of the database object;
(b) add the second tenant version to a second firm; and
(c) insert an address of the second tenant version into the firm table in the object in the database.

12. The integrated computer system of claim 11, the processor further operable to double, by the processor, a portion of memory allocated to the firm table, wherein the portion of memory is doubled when the firm table is three-quarters full.

13. The integrated computer system of claim 10, the processor further operable to:
(a) access the object in the database;
(b) cheek for the tenant version of the object in the database; and
(c) return the tenant version of the object in the first firm.

14. A non-transitory machine readable memory medium encoded with a plurality of processor-executable instructions for:
(a) connecting an application program to a data repository for a database;
(b) generating a first Firm for a first tenant;
(c) placing an address of a first object of the first firm into a knowledge base pointer associated with the first tenant;
(d) placing an address of a main database object of the database into a pointer in an object of the first firm;
(e) accessing the first firm through the knowledge base pointer and the database through the pointer object of the first firm;
(f) generating a second firm for a second tenant;
(g) placing an address of a first object of the second firm into a knowledge base pointer associated with the second tenant; and
(h) placing the address of a main database object of the database into a pointer in an object of the second firm;
(i) adding one or more tenant objects to the first Firm;
(j) linking one or more node object of the first Firm to the one or more tenant objects;
(k) generating a tenant version of an object in the database;
(l) adding the tenant version to the first Firm; and
(m) creating a firm table in the object in the database, wherein the firm table comprises an address of the tenant version of the object in the database.

15. The non-transitory machine readable memory medium of claim 14, further encoded with a plurality of processor-executable instructions for:
(a) generating a second tenant version of the object in the database;
(b) adding the second tenant version to the second firm; and
(c) inserting an address of the second tenant version into the firm table in the object in the database.

* * * * *